United States Patent
Mundy et al.

(10) Patent No.: US 12,247,754 B2
(45) Date of Patent: Mar. 11, 2025

(54) HVAC CONTROL SYSTEM

(71) Applicants: Kevin Mundy, Castle Hill (AU); Hugo Blanc, Castle Hill (AU)

(72) Inventors: Kevin Mundy, Castle Hill (AU); Hugo Blanc, Castle Hill (AU)

(*) Notice: Subject to any disclaimer, the term of this patent is extended or adjusted under 35 U.S.C. 154(b) by 362 days.

(21) Appl. No.: 17/609,760

(22) PCT Filed: May 6, 2020

(86) PCT No.: PCT/AU2020/050448
§ 371 (c)(1),
(2) Date: Nov. 8, 2021

(87) PCT Pub. No.: WO2020/223763
PCT Pub. Date: Nov. 12, 2020

(65) Prior Publication Data
US 2022/0221179 A1    Jul. 14, 2022

(30) Foreign Application Priority Data
May 9, 2019    (AU) ................. 2019901585

(51) Int. Cl.
*G06F 1/16*    (2006.01)
*F24F 11/52*    (2018.01)
(Continued)

(52) U.S. Cl.
CPC ............... *F24F 11/52* (2018.01); *F24F 11/58* (2018.01); *G06F 1/1632* (2013.01);
(Continued)

(58) Field of Classification Search
CPC ........... F24F 11/52; F24F 11/58; G05B 15/02; G05B 2219/2614; G05B 2219/2642; G06F 1/1632; H04L 12/2803
See application file for complete search history.

(56) References Cited

U.S. PATENT DOCUMENTS

2011/0298736 A1    12/2011    Madonna et al.
2012/0061480 A1*    3/2012    Deligiannis ............ G05B 15/02
340/5.2
(Continued)

FOREIGN PATENT DOCUMENTS

EP    2 924 532 B1    2/2019

OTHER PUBLICATIONS

Notification of Transmittal of International Preliminary Report on Patentability, mailed May 20, 2021, in International Application No. PCT/AU2020/050448 (19 pages).
(Continued)

*Primary Examiner* — Michael W Choi
(74) *Attorney, Agent, or Firm* — Michele V. Frank; Venable LLP; Keith G. Haddaway

(57) ABSTRACT

A heating, ventilation and air conditioning (HVAC) control system comprising: a smart base attached to a building; and a hub which is dockable to the smart base; wherein: the smart base comprises: a user interface for controlling a limited set of HVAC parameters; and a wireless communication module; the hub comprises: a user interface for controlling a comprehensive set of HVAC parameters; and a wireless communication module; and wherein the hub and the smart base are configured to enable the hub user interface to control the comprehensive set of HVAC parameters if the hub is docked to the smart base; or the hub is undocked from the smart base and the hub is within communication range of the smart base over the low power wireless network.

10 Claims, 16 Drawing Sheets

(51) Int. Cl.
    *F24F 11/58*    (2018.01)
    *H04L 12/28*    (2006.01)
(52) U.S. Cl.
    CPC .. *H04L 12/2803* (2013.01); *G05B 2219/2614* (2013.01); *G05B 2219/2642* (2013.01)

(56)    References Cited

U.S. PATENT DOCUMENTS

| | | |
|---|---|---|
| 2013/0338839 A1 | 12/2013 | Rogers et al. |
| 2014/0075075 A1 | 3/2014 | Morrill et al. |
| 2015/0276239 A1* | 10/2015 | Fadell .................... G05B 15/02 236/51 |
| 2016/0195856 A1 | 7/2016 | Spero |
| 2016/0195881 A1 | 7/2016 | Britt et al. |
| 2019/0277531 A1* | 9/2019 | Gillette .................... F24F 11/56 |

OTHER PUBLICATIONS

International Search Report and Written Opinion mailed May 22, 2020, in corresponding International Application No. PCT/AU2020/050448 (24 pages).

Horyachyy, O., "Comparison of Wireless Communication Technologies used in a Smart Home: Analysis of wireless sensor node based on Arduino in home automation scenario", Blekinge Institute of Technology, Sweden, published Jun. 2017 <URL:https://www.diva-portal.org/smash/get/diva2:1118965/FULLTEXT02> (73 pages).

* cited by examiner

| No. | Item |
|---|---|
| 1 | Air conditioning control logic |
| 2 | Wire detection logic |
| 3 | User Interface input detection |
| 4 | User Interface output display |
| 5 | Default settings |
| 6 | Fall back strategy |

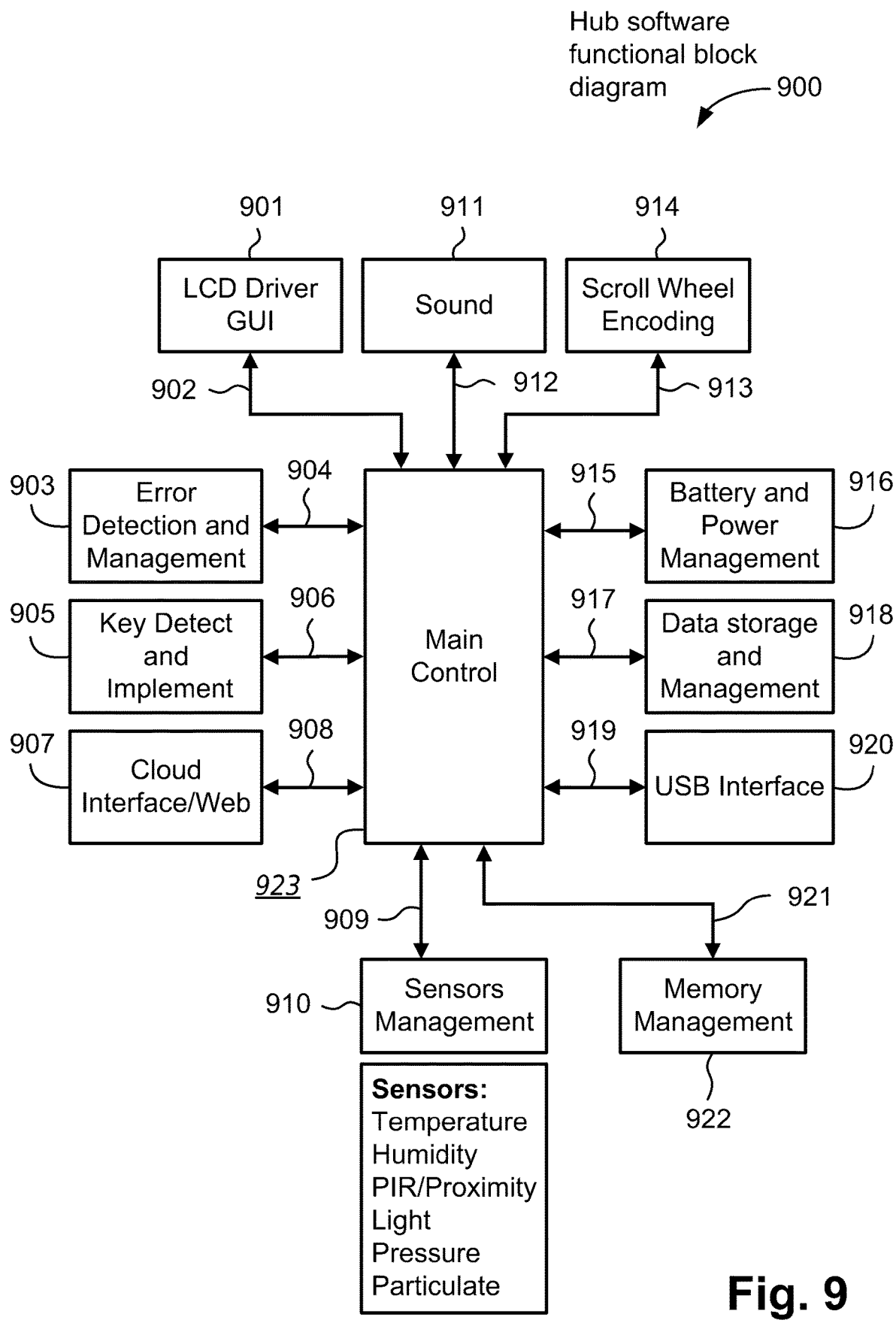

HVAC CONTROL SYSTEM

CROSS REFERENCE TO RELATED APPLICATIONS

The present application is a National Phase of International Application Number PCT/AU2020/050448, filed May 6, 2020, which claims priority to Australian Patent Application No. 2019901585, filed May 9, 2019, both of which are hereby incorporated by reference in their entireties.

TECHNICAL FIELD

The present invention relates generally to HVAC control systems. The present invention also relates to a method and apparatus for controlling HVAC systems, and to a computer program product including a computer readable medium having recorded thereon a computer program for controlling HVAC systems.

BACKGROUND

Presently, different types of systems are available for monitoring and controlling the user environment.

Currently, in proprietary HVAC systems the user generally needs to purchase the entire system, including an HVAC (Heating, Ventilation and Air Conditioning) unit and controls, from the same manufacturer, in order to monitor and control the environment. This arrangement locks the user into the manufacturer ecosystem, leaving the user with little if any flexibility over the devices that can be selected to operate within the environment to be controlled.

Alternately the user can currently select what is referred to as a "24 VAC type control" where the user can select an HVAC unit from any manufacturer, provided it can be controlled from a 24 VAC thermostat. The user can then select a 24 VAC thermostat, which can be purchased from many suppliers, to control the system, not having to buy it from the HVAC unit manufacturer. This provided the user with more flexibility in choosing the type of thermostat to control the HVAC system. The 24 VAC control thermostats presently available on the market comprise a base which is mounted to a wall, and a thermostat that is mounted to the base. In such arrangements power is connected to the wall base which in turn powers the thermostat. Accordingly, the thermostat loses power once taken off the wall base.

There are some current HVAC installations where a C wire is not available. The C wire is used to provide continuous 24V power to the base and thus to the thermostat. Absence of a C wire causes added complexity in order to provide power to the thermostat. For example, some current thermostats do not require a C wire as they are battery powered. Other current thermostats require special hardware that allows them to re-purpose the wires. This increases the complexity in installation.

Some current thermostats having an internal battery but without a C wire use "power stealing" to charge the battery. Power stealing operates by sending a small pulse to the equipment switch and using the energy therein to charge the thermostat battery. Power stealing sometimes results in false equipment activation, which is clearly undesirable from the customer perspective

SUMMARY

It is an object of the present invention to substantially overcome, or at least ameliorate, one or more disadvantages of existing arrangements, or to provide a useful alternative.

Disclosed are arrangements, referred to as Fixed-Portable Control (FPC) arrangements (also referred to as FPC systems), which seek to address the above problems by providing (A) a limited control capability element (i.e. a Smart base) which is fixedly attached to a wall in the building (or building complex) whose HVAC is to be controlled, and which enables a user to control a limited set of HVAC variables when the Smart base is used alone, and (B) a comprehensive control capability element (i.e. a Hub) which is removably dockable to the Smart base, and which enables the user to control a comprehensive set of HVAC variables whether the Hub is docked to or undocked from the Smart base, provided that the Hub is within wireless communication range of the Smart base, these two control elements together providing a reliable, robust and flexible suite of control capabilities to a user who can thereby control the HVAC system from either the fixed location of the Smart base, or while roaming within the building complex with the Hub.

According to a first aspect of the present disclosure, there is provided a heating, ventilation and air conditioning (HVAC) control system comprising: a smart base which is fixedly attached to a building whose HVAC is to be controlled; and a hub which is removably dockable to the smart base; wherein: the smart base comprises: a smart base user interface for controlling a limited set of HVAC parameters; and a wireless communication module for communicating over a low power wireless network; the hub comprises: a hub user interface for controlling a comprehensive set of HVAC parameters; and a wireless communication module for communicating over the low power wireless network; and wherein the hub and the smart base are configured to enable the hub user interface to control the comprehensive set of HVAC parameters if at least one of: the hub is docked to the smart base; and the hub is undocked from the smart base and the hub is within communication range of the smart base over the low power wireless network.

The arrangement described in the paragraph above can be combined with any one or more of the arrangements described in the following eight paragraphs.

In the HVAC control system optionally the smart base further comprises a smart base sensor for sensing a value of an environmental parameter; the hub further comprises a hub sensor for sensing the value of the environmental parameter; and the smart base and the hub are configured, when the hub is either docked to the smart base or is within communication range of the smart base over the low power wireless network, to control the comprehensive set of HVAC parameters dependent upon (a) the hub user interface and at least one of (b) the smart base sensor, (c) the hub sensor, and (d) a combination of the smart base sensor and the hub sensor.

The HVAC system optionally further comprises a free-standing sensor, wherein the smart base and the hub are configured, when the hub is either docked to the smart base or is within communication range of the smart base over the low power wireless network, to control the comprehensive set of HVAC parameters dependent upon (a) the hub user interface, and (b) at least one of the smart base sensor, the hub sensor, the free-standing sensor and a combination of two or more of the smart base sensor, the hub sensor and the free-standing sensor.

Optionally, in the HVAC system if the hub is undocked from the smart base and the hub is unable to communicate with the smart base over the low power wireless network the smart base controls the HVAC system dependent upon the smart base user interface and last active control settings stored in the smart base prior to losing communication connection with the hub.

Optionally, in the HVAC system the smart base is configured (a) to detect the loss of communication with the Hub and (b) control the limited set of HVAC parameters dependent upon the smart base sensor; and the hub is configured to (a) to detect the failure of one of the hub sensor, the smart base sensor and the free-standing sensor, and (b) present associated sensor failure information on the hub user interface.

Optionally, in the HVAC system, upon detection of unavailability of one or more of the smart base sensor, the hub sensor and the free-standing sensor, one of the hub and the smart base performs manual selection of one or more other sensors dependent upon user information input to at least one of the hub user interface and the smart base user interface, said one or more manual selected sensors being used to control the HVAC system.

Optionally, in the HVAC system, upon detection of unavailability of one or more of the smart base sensor, the hub sensor and the free-standing sensor, one of the hub and the smart base performs auto-selection of one or more other sensors dependent upon information in an auto-sensor selection table, said one or more auto-selected sensors being used to control the HVAC system.

Optionally, the HVAC system further comprises: a router for connecting at least one of the hub, the smart base and the free-standing sensor to at least one of a remote server and a mobile terminal over a communications network.

Optionally, in the HVAC system the hub collects information about a state of the smart base and sends the collected information to at least one of the remote server and the mobile terminal for data storage; the remote server has a remote server user interface, and the mobile terminal has a mobile terminal user interface; and the remote server user interface and the mobile terminal user interface can control the comprehensive set of HVAC parameters over the communications network.

According to another aspect of the present disclosure, there is provided a smart base for use in a heating, ventilation and air conditioning (HVAC) control system, the smart base being fixedly attached to a building whose HVAC is to be controlled, the smart base comprising: a smart base user interface for controlling a limited set of HVAC parameters; and a wireless communication module for communicating over a low power wireless network with a hub; wherein the smart base is configured to enable a hub user interface of the hub to control a comprehensive set of HVAC parameters if at least one of: the hub is docked to the smart base; and the hub is undocked from the smart base and the hub is within communication range of the smart base over the low power wireless network.

According to another aspect of the present disclosure, there is provided a hub for use in a heating, ventilation and air conditioning (HVAC) control system, the hub being removably dockable to a smart base fixedly attached to a building whose HVAC is to be controlled; the hub comprising: a hub user interface for controlling a comprehensive set of HVAC parameters; and a wireless communication module for communicating over a low power wireless network with the smart base; wherein the hub is configured to enable a hub user interface of the hub to control the comprehensive set of HVAC parameters if at least one of: the hub is docked to the smart base; and the hub is undocked from the smart base and the hub is within communication range of the smart base over the low power wireless network.

According to another aspect of the present disclosure, there is provided a method performed by any one of the aforementioned systems.

According to another aspect of the present disclosure, there is provided a computer program product including a computer readable medium having recorded thereon a computer program for implementing any one of the methods described above.

Other FPC arrangement features are also disclosed.

BRIEF DESCRIPTION OF THE DRAWINGS

FIG. 9 is an example of a functional software block diagram which may be used to implement a Hub module;

DETAILED DESCRIPTION INCLUDING BEST MODE

Figure 1:
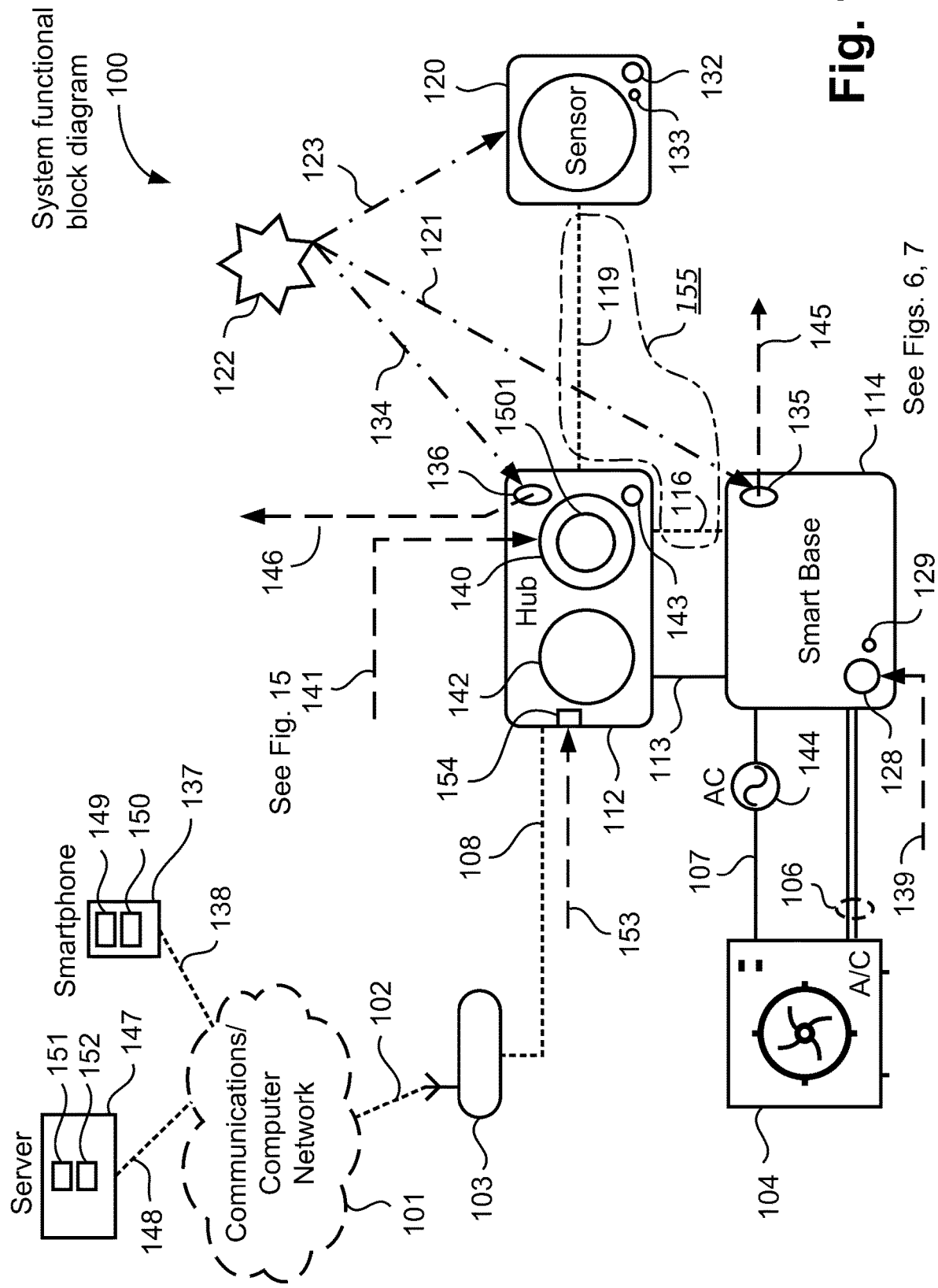
FIG. 1 is a functional block diagram of the disclosed FPC arrangement.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such should not be interpreted as a representation by the present inventor(s) or the patent applicant that such documents or devices in any way form part of the common general knowledge in the art.

As described hereinafter in more detail with reference to FIG. 1, the disclosed FPC arrangements provide the user with an ability to use a thermostat (referred hereinafter as the Hub 112) for comprehensive control of a Heating, Ventilation, and Air Conditioning (HVAC) system, exemplified by an air conditioning unit 104 in this description, while the Hub 112 is not docked with the wall base (referred to hereinafter as the Smart base 114). The Smart base 114 is generally fixedly attached to a wall in the building whose HVAC is to be controlled by the FPC system 100. The term "dock" in the present specification means that the Hub module 112 is physically attached to the Smart base module 114, effecting an electrical connection depicted by a solid line 113 between the removably attachable (also referred to as removably dockable) Hub 112 and the Smart base 114. The aforementioned comprehensive control is available to the user while the user is mobile within the property being served by the air conditioning unit 104 provided that the Hub 112 remains in communication with the Smart base 114 through a wireless network 116, provided the Hub 112 has enough battery power from its internal battery 812 (see FIG. 8) to enable the user to use the Hub 112. In these FPC arrangements the Hub 112 can operate in the same manner and provide the same type and level of control when docked to or undocked from the Smart base 114.

The disclosed FPC arrangements thus enable the user to keep using the Hub 112 even though it has been undocked from the Smart base 114. The HVAC system 104 connected to the Smart base 114 thus continues to operate, as if nothing has changed, in terms of the functionality or control of the FPC system, whether the Hub 112 is docked to or undocked from the Smart base 114.

Furthermore, the HVAC system 104 continues to operate, even if the Hub 112 has lost power through discharge of its internal battery 812 due to the Hub 112 being undocked from the Smart base 114. In this situation, the User is still able to control the HVAC system 104 through the Smart base 114 alone. In this situation the Smart base 114 continues to operate using the last active control settings it had before losing communication connection with the Hub 112.

The user can recharge the in-built battery 812 in the Hub 112 while the Hub 112 is undocked from the Smart base 114 using a suitable external charger (not shown) connected to a USB port 154 on the Hub 112 using a suitable USB cable (not shown). In this situation the user is able to control the HVAC system 104 using the Hub 112 as soon as internal battery 812 in the Hub 112 is sufficiently charged to enable the Hub 112 to re-establish a wireless connection 116 (see FIG. 1) to the Smart base 114. The user can continue using the Hub 112 while the Hub is still connected to external charger (not shown). Once sufficient battery power is available from the Hub internal battery 812 the user can disconnect the USB cable from the USB port 154 and continue using the Hub 112 until the internal battery 812 of the Hub 112 discharges again. Once the Hub 112 is docked to the Smart base 114, the user can also continue using the Hub 112 in the normal manner.

Sensors available in the FPC system can automatically be assigned depending on where the Hub 112 is located. Whether the Hub 112 is docked to the Smart Base 114 or whether the Hub 112 is undocked from the Smart Base 114 the Hub 112 is still able to communicate with the Smart Base 114 through the wireless connection 116. When the internal battery 812 of the Hub 112 is depleted while the Hub 112 is undocked from the Smart base 114, the Smart base 114 can control the HVAC system 104 in what is referred to as "Stand Alone mode", even though the internal battery 812 of the Hub 112 is depleted.

The FPC arrangements can be used in installations where no C wire is available.

FIG. 1 is a functional block diagram 100 of one of the many disclosed FPC arrangements possible. Power at AC 24-volt is provided as depicted by a solid line 107 from the air conditioner 104 to the Smart base module 114 (described hereinafter in more detail with reference to FIGS. 6, 7 and 16). Control communication is provided as depicted by a double line 106 between the air conditioner 104 and the Smart base module 114. The Smart base module 114 has an inbuilt Smart base sensor 135 which can sense a value as depicted by a dashed arrow 121 of an environmental parameter 122 such as temperature. The Smart base sensor 135 outputs as described hereinafter in further detail with reference to FIG. 6 a sensor signal 145. Clearly the FPC arrangements can be configured with a wide variety of sensors for sensing values of different environmental parameters such as temperature, humidity, barometric pressure and so on. However, for ease of description the remainder of this description will refer to temperature sensors only. This is not intended to limit the type of sensors which can be used with the FPC arrangements.

There can be instances where one or more of the main control sensors of the FPC system 100 (e.g. a hub temperature sensor 136 which is associated with the Hub 112 and 120 which is a free-standing temperature sensor) which the Hub 112 is using fail. The Hub 112 detects this failure of sensor/s and notifies the user about the sensor failure by presenting associated sensor failure information on the hub user interface. The user then can choose to use one or more alternate temperature sensors available in the FPC system. The sensor selection can be done through the Hub user interface 140, 142, 1501 available on the Hub 112. The user can select any of, or any combination of, the available sensors. In one FPC arrangement the Hub 112 is able to auto-assign a temperature sensor, depending on the availability of sensors. In another FPC arrangement, the Smart base 114 is able to use its own sensor 135, when the Smart base 114 detects failure of wireless communication 116 with the Hub 112, in which event no sensed temperature value is available from the Hub 112 to control the connected HVAC system 104. This fall-back strategy for the temperature sensor ensures that there is, under most failure scenarios, a temperature sensor available to control the FPC system if the Hub sensors 136, 120 fail.

FIG. 1 shows one FPC arrangement for controlling the HVAC system 104 with the Hub 112 and the Smart base 114. The HVAC system 104 provides heating, cooling, ventilation and/or air handling for a home such as a single-family home. This home can be a Single/Double/Multi storey, may have zoning and multiples Hubs 112 and multiple Smart bases 114. The FPC systems can provide forced air type heating and cooling. In other FPC arrangements, other type of HVAC systems like radiant heat-based systems, heat pump-based systems and other type of systems can be controlled.

A humidifier, which returns/puts moisture in the return air, may also be included in some FPC arrangements. Similarly, a dehumidifier, which takes the moisture from the air, may be included in other FPC arrangements. Although not shown, alternate FPC arrangements may have functions like venting air (air allowed into the system or air taken out of the system). For this purpose, a damper may be used in the HVAC system.

An emergency heating system may also be present in other FPC arrangements.

In the absence of any other FPC system components the Smart base module 114 can control the air conditioner 104 based on the value 121 of the sensed environmental parameter 122, and one or more of a user control signal 139 received by a smart base user interface 128 on the Smart base module 114 (described hereinafter in more detail with reference to FIG. 16), a user control signal 141 received by a user interface 140,142 on a Hub module 112, and an internal table of stored information (described hereinafter in more detail with reference to FIG. 2). The control effected by the Smart base module 114 is exercised via a control connection 106. The Smart base module 114 also has an indicator 129 to show various modes of operation.

The Hub module 112 (described hereinafter in more detail with reference to FIGS. 8, 9 and 15) can "dock" with the Smart base module 114. The term "dock" in the present specification means that the Hub module 112 is attached to the Smart base module 114, typically by means of a physical attachment which effects an electrical connection depicted by a solid line 113. When docked in this manner power is provided by the Smart base module 114 to the Hub module 112 as depicted by the solid line 113. This power is used, among other things, to charge the internal battery 812 (see FIG. 8) in the Hub module 112. The Hub module 112 has a user interface 140, and a display screen 142 and a motion (e.g. PIR) sensor 143.

Control communication is provided between the Smart base module 114 and the Hub module 112 using wireless communication as depicted by the dotted line 116 in one FPC example. The wireless communication may be based upon any suitable wireless communication protocol such as Wi-Fi (including protocols based on the standards of the IEEE 802.11 family), Bluetooth™ and so on.

The disclosed FPC arrangements support data communication and information sharing between the Hub 112 and any other device in the FPC arrangement such as the Smart base 114, as depicted by the dashed line 116. The dotted line 116 depicts wireless communication between the Smart base 114 and the Hub 112, however it is to be understood that wireless communication also provided between most if not all FPC arrangement components such as the Smart base 114, the Hub 112 and the free standing temperature sensor 120 as depicted by dotted lines 116 and 119 which, in aggregate, constitute a low power wireless network 155 configured to provide wireless communication between elements of the FPC arrangements. The low power wireless communication network 155 can utilise one or more standard wireless protocols like Wi-Fi or Zigbee etc.

In FIG. 1, the connection 116 shows the low power wireless connection between the Smart base 114 and the Hub 112. In normal operation, when the Hub 112 can communicate with the Smart base 114, the communication between the Hub 112 and the Smart base 114 takes place via the connection 116. The communication takes place through the connection 116, whether the Hub 112 is docked to the Smart base 114, as depicted in FIG. 10 A, or the Hub 112 is undocked from the Smart base 114, as depicted in FIG. 10B. The low power wireless network 155 can use one or more standard low power wireless technologies such as Zigbee to connect with other devices in the FPC system. All the devices on this wireless network, talk through a proprietary protocol.

The FPC arrangements can utilise different types of wireless communication such as (a) a Wi-Fi network (108) for communication between the Hub 112 and a router 103, as depicted by the dotted line 108 and (b) the low power wireless network 155 using Zigbee for example, as depicted by dotted lines 116 (between the Hub 112 and the Smart base 114) and 119 (between the Hub 112 and the free-standing sensor 120) in FIG. 1. Unless otherwise specified, the wireless network used for communication between the hub 112 and the router 103 is referred to as the Wi-Fi network 108. Similarly, unless otherwise specified the wireless network used for communication between the Hub 112 and the Smart base 114, and between the Hub 112 and the free-standing sensor 120, is referred to as the low power wireless network 155. Similarly, unless otherwise specified the wireless network used for communication between the router 103 and the remote server 147 or the remote smartphone 137, is referred to as the computer network or the Internet 101.

In some FPC arrangements the Hub 112 wirelessly communicates with the Smart base 114 over the low power wireless network 155. When communicating in this manner, the Hub 112 collects information about the current state of the Smart base 114, which includes the temperature value as well as the control information from the user interface of the Smart base 114. In some FPC arrangements, the Hub 112 provides the control information, gathered by the Hub 112 through its user interface, from the user, to the Smart base 114.

In FIG. 1, the connection 108 is a Wi-Fi connection between the Hub 112 and a router 103. The router 103 provides routing, wireless access point functionality, firewall etc. Each device in the FPC arrangement is assigned a network address from the router 103. The Hub 112 when connected to the Wi-Fi network, is assigned an address by the router 103. Using this address, the Hub 112 communicates with the router 103.

The router 103 is further connected to a computer network 101 through a wired connection 102. The computer network 101 can also be referred to as a Public Network or a Wide Area Network (WAN) or simply as the Internet. The computer network 101 may further be connected to the server 147, through a connection 148. The server 147 can have a processor 151 executing a software application 152. This application 152 can contain user interfaces that allow a user to control the Hub 112 via the server 147. The software application software 152 can also display the current state of the Hub 112 to a user at the server.

A Smartphone or other mobile terminal 137 can also be connected to the computer network 101 through a connection 138. The Smartphone 137 can have a processor 149 executing a software application 150. The application 150 can provide a user interface to a user of the Smartphone 137 enabling the user of the Smartphone to control the Hub 112 through the connection 138, connected to the computer network 101, which in turn is connected to the router 103, through a wired connection 102. The software application 150 executing on the Smartphone can also show the user of the Smartphone the current state of the Hub 112.

In order to communicate with the Internet 101, an address is assigned to each specific device allowing the device to be addressed and communicated to by other devices over the Internet. A single address is given to the router 103 on the public network 101. In order for a particular device on the public network 101 to communicate with another device connected to the router 103 through a wired connection 102, the particular device and the other device have to have respective unique addresses. The allocation of addresses to the particular device and the other device is accomplished by the router 103.

The router 103 has a Network Address Translation (NAT) table, which contains an entry for each communication channel that is opened between a device (like the Hub 112) on the low power wireless network 155 and a device (like the server 147) on the Internet. Any data packet sent by a device such as the Hub 112 on the low power wireless network 155 contains a source address (which is the device address for the Hub in this example on the low power wireless network 155), and a destination address (which is the address for the server 147 in this example on the Internet).

When the router 103 received this data packet from the Hub 112 the router 103 replaces the address of the Hub on the low power wireless network 155 with the address of the router 103 on the Internet and adds a source port which references the corresponding entry in the NAT table. The device on the Internet (such as the server 147 in this example) uses the address of the router 103 and the source port in order to respond to the Hub 112 on the low power wireless network 155. The router 103 then can use the source port to identify, from the NAT table, which device on the low power wireless network 155 the data is directed to.

The Hub module 112 has one or more inbuilt Hub sensors 136 which can sense, as depicted by a dashed arrow 134, a value of one or more environmental parameters 122. The Hub module sensor 136 outputs, as described in further detail with reference to FIG. 6, a sensor signal 146. The Hub module 112 can also receive information, as depicted by a dotted line 119, from a remote sensor 120 which can sense, as depicted by a dashed arrow 123, a value of the one or more environmental parameters 122. One or more environmental parameters 122 can be sensed by the FPC arrangements, by one or more of the inbuilt sensors 135, 136 and the remote sensor 120. The environmental parameters which can be sensed include, but are not limited to, temperature, acceleration, luminosity, presence of a person (using passive infra-red i.e. PIR), noise, atmospheric pressure, humidity and others.

The Hub module 112 can also communicate, as depicted by a Wi-Fi network depicted by the dotted line 108, with the router 103 which enables communication, as depicted by dotted lines 102, 138, with the network 101 and remote devices such as a Smart phone or other mobile terminal or device such as a tablet 137 having a processor 149 which executes a FPC "mobile" software application 150. The Hub module can also communicate over the network 101, as depicted by a dashed line 148, with one or more "cloud based" remote servers 147 each having a processor 151 which executes a FPC software application 152.

The Hub module 112 can communicate FPC system data to the one or more remote cloud based servers 147 so that the FPC system data can be stored in the cloud based servers, to be accessed through the mobile software application 150 executing on the Smart phone 137. This gives a user the ability to access the FPC system data, and control the FPC system 100 from virtually anywhere.

The FPC system data, described hereinafter in more detail below, which is communicated by the Hub module 112 to the cloud based server 147, includes but is not limited to System configuration, FPC system settings, FPC system status, Backup & restore information, and User property and account information.

FPC system configuration: This information defines how the FPC system is configured, noting that the FPC system can be configured in different ways, depending on the user application. The user can use the Hub user interface, as depicted by the dashed arrow 141, to configure the FPC system. Typical FPC system configuration examples include: 1 stage/2 stage Heat Pump, Conventional system, Hybrid system and so on.

FPC system settings: This information specifies FPC system settings such as Set Temperature limits, Away mode Temperature limits and so on as well as current user settings. Current FPC system settings are typically stored on the cloud server 147 for access by the FPC system 100. When the user changes a setting on the FPC system, the changed FPC system settings are stored on the cloud server 147 and the FPC system can thereafter access the changed settings from the cloud based server 147.

FPC system Status: This information represents the status of the FPC system at any point in time. This information includes current temperature values, FPC system modes and so on. The FPC system status is continuously updated, as the variables in the FPC system change. The devices connected to the FPC system can access the FPC system status information stored in the server 147 at virtually any time, thereby providing mobile control capability.

Backup restore: On some occasions, the FPC system may lose power, or it may lose FPC system configuration information. The cloud based server 147 can restore the FPC system configuration and the FPC system settings, so that the FPC system can re-commence operation using a previous FPC system state (which includes FPC system configuration, FPC system settings and FPC system status).

User property & account information: The FPC system 100 is configured as a user property, with different devices forming part of the property. The user property and account information enables the user to add/delete devices from the property, make settings and control the devices in a group. This information is stored in the server 147 under a unique user account number. The user can log in/out of the FPC system and can save the user FPC system configuration information, to be accessed through different mediums like Computers, Smart phones, tablets and so on using different operating systems.

The Hub module 112 can control the air conditioner 104, as directed by the user input 141 received by the user interface 140 on the Hub module 112 (described hereinafter in more detail with reference to FIG. 15) both when the Hub module 112 is docked to the Smart base module 114, and also when the Hub module 112 is physically removed (ie undocked) from the Smart base module 114, provided that the Hub module is within wireless communication range of the Smart base module 114 (depicted by 116), and has sufficient battery power from the internal Hub battery 812 to support operation of the Hub module 112 when undocked.

While the Hub module 112 is docked to the Smart base module 114 the combination of the Hub module 112 and the Smart base module 114 provides a user of the FPC arrangement with the ability to flexibly control the air conditioner 104.

Different Operation strategies, defined hereinafter in more detail below, including "standalone mode", "override mode", and "last settings", are used by the FPC system 100, to ensure that the FPC system operates reliably in different failure modes.

The FPC system can automatically switch to some operation modes, and there are other operation modes which require user input. The user can typically operate the FPC system, even though one or more devices or control points (such as the sensors 135, 136) might have failed. The term "control point" refers to a sub-system (such as the Smart base sensor 135 and its associated control circuitry) with its own structure and functions (within the main process or FPC system) from where full or partial control can be exercised over the entire process or FPC system.

Standalone operation: In a typical scenario, the Hub module 112 is connected to the Smart base module 114, which is connected to the air conditioner 104. The FPC system 100 is said to be working in a normal operation when the Hub module 112 is connected to the Smart base module through the low power wireless network 155 in which event the Hub module 112 and the Smart base module 114 can communicate with each other wirelessly as depicted by the dashed line 116. The user can use the Graphical User Interface (GUI) 140, 142, 143 on the Hub module 112 to make changes, see the status of the Smart base module 114 and so on. In this scenario, the Smart base module 114 is not in standalone or override mode.

The Hub module 114 may lose connection to the Smart base module 114 through the wireless connection 116 in certain circumstances. This may happen, for example, if (a) the Hub module 112 runs out of battery power, and therefore turns OFF, (b) the User accidentally turns the Hub module OFF via the control signal 141, (c) The Hub module 112 is damaged, to the extent that it cannot operate and fails in the OFF condition, (d) The user is using the Hub module 112 in an undocked mode and takes the Hub module 112 to an area where the Hub module 112 is not able to maintain a wireless connection with the Smart base module 114 i.e. the Hub module 112 goes out of wireless communication range of the low power wireless network 155.

In the above situations the Smart base module 114 detects loss of the communication link 116 and consequently the Smart base runs the HVAC system 104 connected to it. The Smart base 114 keeps on running the FPC system based on the last command it received from the Hub 112. If the Smart base 114 does not receive further commands from the Hub 112, the Smart base 114 continues to run the FPC system 100 based upon the last command the Smart base 114 received from the Hub 112, and thus continues to run the air conditioner 104 with the same settings of Set Temperature, Mode, configuration and so on as were in effect when it was last connected to the Hub module 112.

Override mode: This is an emergency mode in which the Smart base 114 is operated, and occurs when the user has, for example, physically mislaid the Hub module 112 and wants to run the air conditioner 104 with pre-set settings. To put the Smart base 114 into override mode the user depresses the tactile switch 128 on the Smart base 114 and keep it depressed for some time (typically 3-7 seconds). An external interface 701 in the Smart base 114 (see FIG. 7) detects this long-duration switch depression and, according to the stored information (described hereinafter with reference to FIG. 2) and an algorithm layer 707 in the Smart base 114, assigns an action to the switch depression. The action in this case would be to direct the Smart base 114 into the Override mode. When the Smart base 114 is in the override mode, the Smart base 114 retrieves settings from the stored information (see FIG. 2). These settings include Set temperature, Air conditioning mode, and so on.

Figure 18:
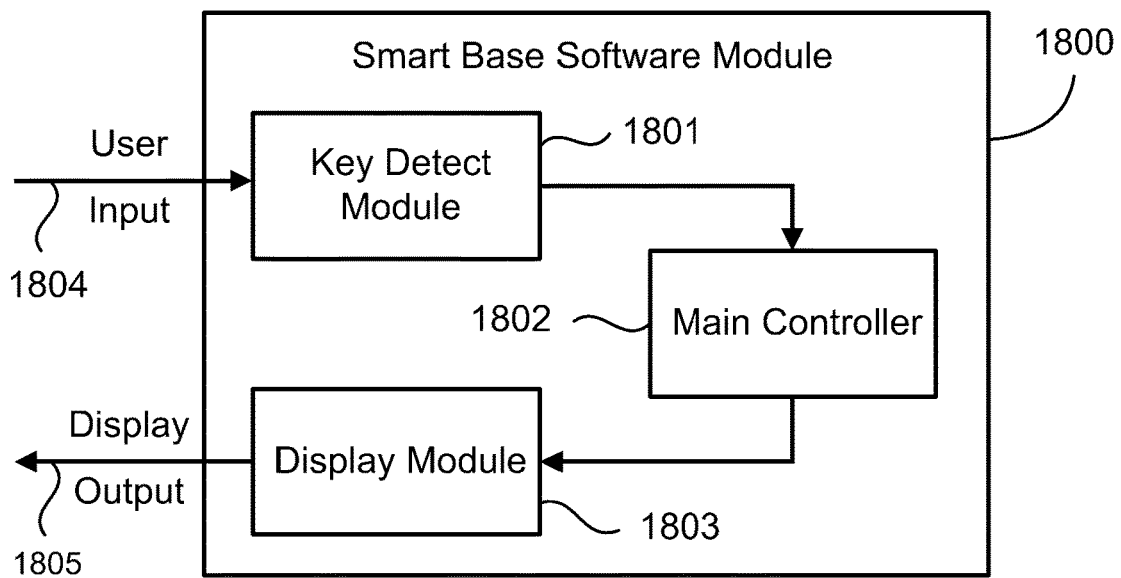
FIG. 18 is another example of a functional software block diagram which may be used to implement a Smart base module.

During operation of the Smart base 114 in the override mode, a short press of the switch 128 on the Smart base module 114, detected by the external interface 701, directs the stored information and the algorithm layer 707 to direct the Smart base module 114 to perform a process depicted in FIG. 18.

FIG. 18 depicts an example of a software module 1800 for implementing the Smart base.

Key Detect Module 1801: The function of this module is to detect if the user has pressed the key on the Smart Base. It further contains the following sub parts:
Key Press Detect Module
Key Press Duration module
Action allocation module The Key Press Detect Module: The main function of this module is to reliably detect a "real" activation, also referred to as a "Key press" of the user interface 128 on the Smart base (which is a button switch in the examples described herein). This is to ensure that real presses are distinguished from noise. An in-built software application in the key detection module detects a press. Detecting a press means detecting an accurate and reliable press which results in a change in voltage level. Press detection takes into account the fact that when the mechanical switch 128 is pressed, from the moment the user starts pressing it to the moment the contact is made between the two contacts and thereafter, conductivity across the switch changes. This detection of the press is done by the Key Detection Module.

Pressing the switch 128 for different durations causes correspondingly different outcomes for the Smart base 114. One of the key things the software application considers is the duration for which the switch is kept pressed. If it is kept pressed for more than a minimum duration and the signal output detected by the micro controller is stable, the Key Press Duration Module determines the duration for which the switch has been kept pressed.

Key Press Duration Module: This software module determines the duration for which the key has been pressed. The press duration defines the action required by the user.

Action Allocation Module: This module takes Key press durations as inputs and specifies corresponding actions as outputs. The corresponding actions are what the Smart base 114 will perform as a result of the Key press. This module compares the determined duration of the key press of the switch 128, using a look up table, with information output from the lookup table. The output from the look up table is then converted into a required action.

Display Module: The function of Display module is to take input from the main controller 1101SBM and generate a display output, which in this case is the LED colour. The input from the main controller can be a simple colour code for the LED colour. Since the only display device the Smart base 114 has is the LED 129 in the present example, the main controller provides the necessary colour as input to the Display Module. The Display Module simply drives the LED 129 with the colour required.

Look Up Table: A Look Up Table is a table of values, organized in the form of Inputs/Outputs as shown below in Table 1. In the table, every input value corresponds to an output value. A simple look up table looks like the one below:

TABLE 1

| Input | Output |
|---|---|
| Input 1 | Output 1 |
| Input 2 | Output 2 |
| Input 3 | Output 3 |
| Input . . . | Output . . . |

For the Smart base 114, an "Input" is the duration for which the key 128 is pressed, and the "Output" is the corresponding action required. For example, if the key 128 is pressed for 1 seconds, the output would be to switch the FPC system to the next operating mode. If the input for the Key duration is 3 seconds, the output would be to place the Smart base 114 in override mode.

The action which is output in Table 1 above is used as an input to another look up table, depending on the action required by the user. If the user wants to change Air Conditioning mode (which is selected using a short press of the switch 128), a second look up table for Air conditioning modes is used to find the next Air Conditioning mode for the FPC system 100. This look up table takes the current operation mode as an input, and outputs a "next mode" to the Smart base.

Last settings: While the Smart base 114 is controlling the FPC system 100, the user may make changes to the settings being used by the Smart base 114 to run the air conditioning system. In one FPC arrangement, any change made to setting/s is saved by the Smart base 114 in its internal memory 608 which is a non-volatile memory, so that the settings are preserved even if the power to the Smart Base 114 is lost. When the Smart base 114 power is restored, during a boot up process, the Smart base 114 looks for settings in the memory 608 which can be used to initialise the FPC system. If the Smart base 114 finds settings in its non-volatile memory 608, it will use these settings to start the FPC system. The Smart Base will then push these settings to the Hub 112, so the Hub 112 can start in the last state in which the FPC system was operating before losing the power.

In another FPC arrangement any changes made to the settings via key presses to the switch 128 of the Smart base 114 are saved by the Hub 112 in its internal memory 803 which includes a non-volatile memory in order to ensure that the settings are preserved even when the power to the Hub 112 is lost. This can occur for example when the Hub 112 is undocked from the Smart Base 114 and the internal battery 812 has discharged. When the Hub power is restored, the Hub 112 performs a boot up process during which the Hub 112 retrieves settings from its non-volatile memory 803. If the Hub 112 finds the last settings, it will use these settings to start the FPC system. The Hub will then push these settings to the Smart Base 114 so the Smart base 114 can synchronise its settings with the Hub 112, and the FPC system starts in the same state as it was in before losing the power.

In one FPC arrangement in the internal memory 608 of the Smart base 114 information defining default settings is stored. This information contains settings that are used as default settings if the Smart base 114 is not able to obtain settings from user input or from the Hub 112. This can occur in a number of circumstances including (a) when the Smart base 114 starts after a power recycle, in which event information is required as to the relevant LED colour to display, according to the mode the FPC system needs to be in and the Set point to use to control the FPC system, (b) when the Smart base is in Override mode, in which case information is required as to what temperature settings to use, what mode to start in, what LED colour (LED blinking frequency, if required) to display, (c) what temperature setting value to use, if the value received from the Hub 112 is invalid, (d) what mode to go to if the mode received from the Hub 112 is invalid etc.

The Smart base default settings allow the Smart Base to place the FPC system back into a known state, from where the user can then change the FPC system settings as needed.

In another FPC arrangement the Hub 112 stores all the default settings in its internal memory 803 which includes the non-volatile memory. On power recycle, the Hub 112 updates itself with the default settings if it cannot find any saved last settings or the saved last settings were corrupted. The Hub 112 then pushes the default settings to the Smart Base 114. In this manner, the FPC system is restored to a known state. The user can then make changes and use the FPC system, as needed.

The above default settings enable the Smart base 114 and the Hub 112 to function in a reliable and expected way. These settings can be changed during firmware upgrade of the Smart base 114 and the Hub 112.

When the Hub 112 is docked to the Smart base 114, the user can easily go to the Hub 112 and configure/change the FPC system settings/status. While the Hub 112 is docked to the Smart base 114 the Hub 112 battery 812 is continuously charged via the connection 113 with the Smart base 114.

Furthermore, when the Hub module 112 is undocked from the Smart base module 114 but is within communication range of the Smart base module 114 as dictated by the range performance of the wireless communication 116, the user of the FPC arrangement is able to flexibly control the air conditioner 104 using the Hub 112.

When the Hub 112 is undocked from the Smart base 114, in terms of functionality nothing changes from the docked situation provided that the Hub 112 is connected to the Smart base 114 through the wireless network 155. This provides mobility to the user who can take the Hub 112 anywhere as long as it is connected to the Smart base 114 through the wireless network 155. This can be useful, for example, when the user wants to put the Hub 112 on their side table, before going to bed.

The Hub, when undocked, can be charged through a USB cable 153 connected to a USB port 154 on the Hub 112 using a suitable external charger (not shown). In this manner the user can keep the Hub 112 charged even though the Hub 112 is not docked to the Smart base 114.

The Hub 112, if using its temperature sensor 136, provides a local temperature value to the user. This is helpful when the Smart base 114 is installed in a non-accessible area, or in an area whose temperature may not be compatible with the area in which the user is located. This provides local temperature control to the user.

In case the Hub 112 goes out of range from the Smart base 114 when it is undocked, the Smart base 114 can still keep the air conditioner 104 running by going into Standalone operation. In this operation, the Smart base 114 keeps on running the air conditioner 104 using the last settings with which the air conditioner 104 was operating, before losing connection with the Hub 112. If after some time the Hub 112 is again connected through the wireless connection 116 to the Smart base 114, the Hub 112 can revert to normal control, where the Hub 112 controls the Smart base 114.

Temperature sensor: There can be instances where the main control point of the FPC system i.e. temperature sensor, which the Hub 112 was using, fails. In this scenario, the Hub 112 detects this occurrence and starts using the Smart base temperature sensor 135, to control the FPC system. This fall-back strategy for the temperature sensor makes sure that there is a temperature sensor available to control the FPC system if the Hub sensor fails.

Figure 13A:
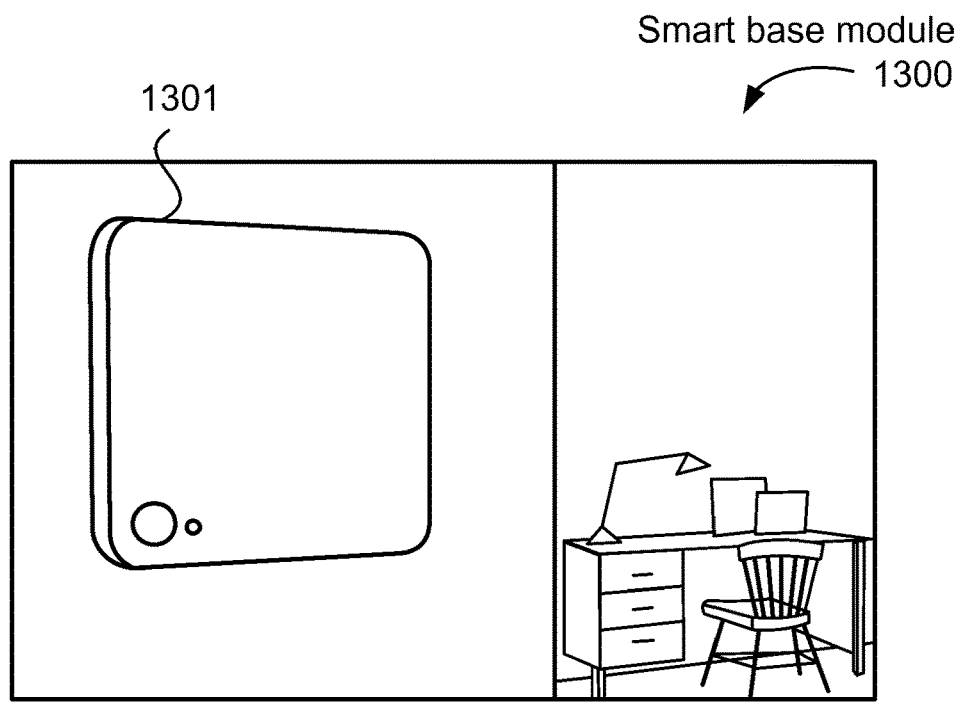
FIGS. 13A and 13B are physical depictions 1300, 1303 of a Smart base module 1301 and a Hub 1302.
Figure 13B:
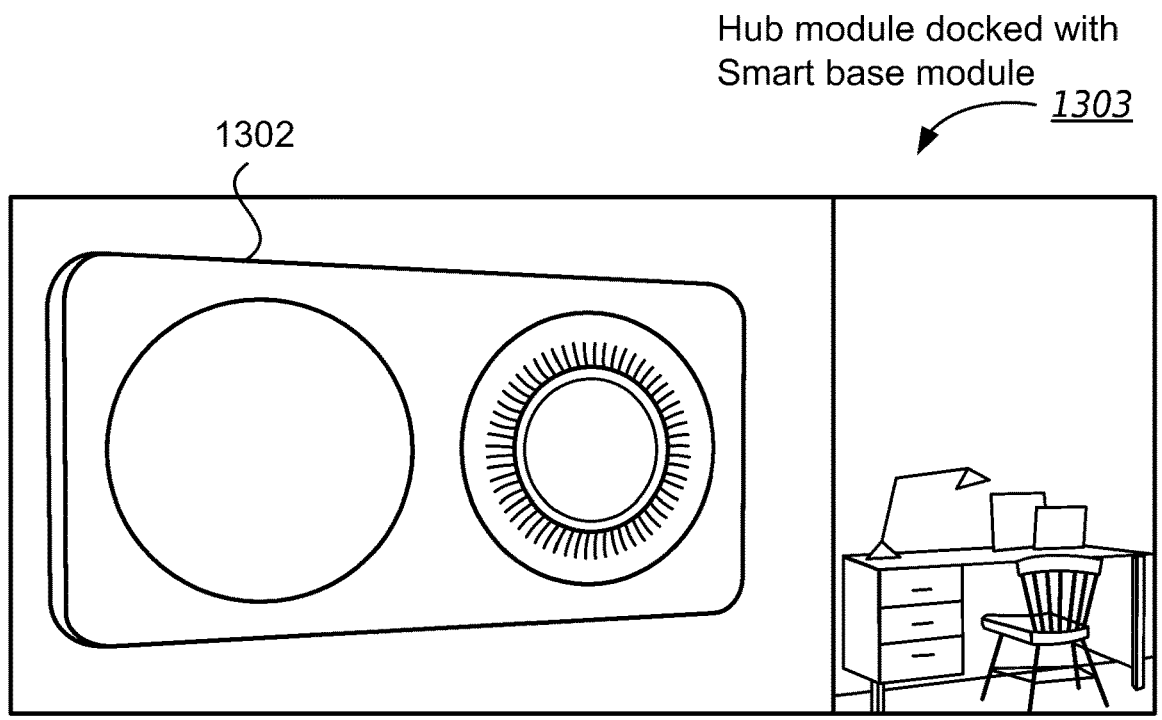

FIGS. 13A and 13B are physical depictions 1300, 1303 of a Smart base module 1301 and a Hub 1302 respectively.

FIG. 13A shows the Smart base module 1301 mounted on a wall in a position which can be easily and conveniently accessed by someone wishing to control the air conditioner 104.

FIG. 13B shows the Hub module 1302 docked to the Smart base module 1301, and it is evident that someone wishing to control the air conditioner can easily access the Hub module 1302 in the scenario shown.

Figures 2, 3:
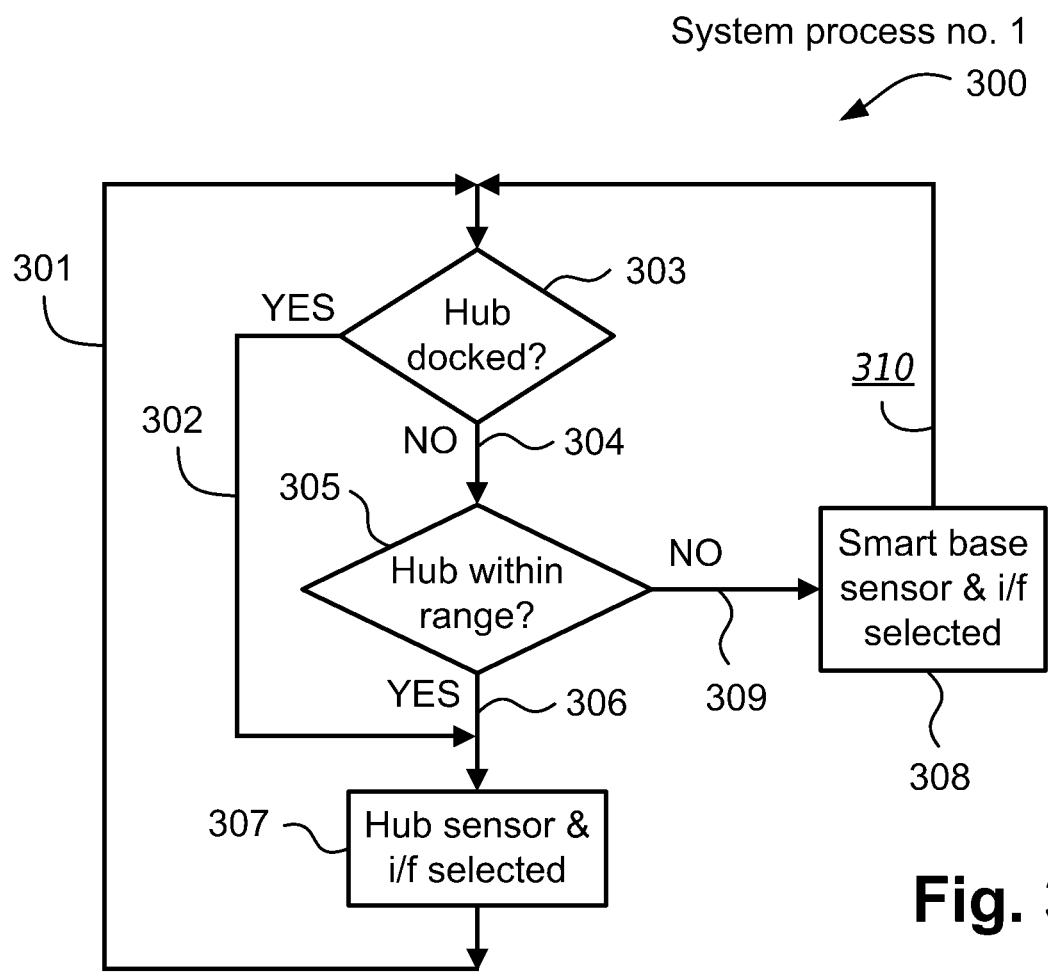
FIG. 2 depicts an example of stored information which is used to control an air conditioner when a Smart base module is in control.
FIG. 3 is an example of a process used by the FPC arrangement to control the air conditioner.

FIG. 2 depicts an example of stored information which is stored in the Smart base memory 608 and used to control the air conditioner 104 when the Smart base module 114 is in control. The various items in the table, i.e. Air-conditioning logic, Wire detection logic, User interface input detection, User interface output display, Default settings, Fall back strategy and Last settings, are described in further detail below.

Air conditioning control logic: The Hub 112 acts as an interface for controlling the Air conditioner 104. The control of the air conditioner 104 is performed by Air conditioning logic in the Smart base 114. The logic consists of decision making software commands and data, for making decisions based on a pre-set algorithm. This algorithm performs the following functions:

The FPC system components are protected;
Accurate and fine control of the system parameters is provided;
Safe control of the FPC system is provided, at all times; and
The ability to set/change variables within pre-set limits is provided.

Wire detection logic: The Smart Base 114 includes the circuitry and the software algorithms to detect the wiring to which it is connected. This is used to make the FPC system more intuitive for the user. Based on the wires detected, the Smart base 114 can determine what devices are connected to it. This information is passed to the Hub 112. The Hub 112 can then compare this with the user selection of the type of FPC system. On the basis of comparison, the Hub can do the following:

Notify the user if there is a discrepancy between the selection and the wire detection (e.g. via detection of missing or extra wires);
Advise the user of the correct wiring for the system type selected;
The above feature can be used by the user if he/she wants to reconfigure the FPC system, which might occur for any of the following reasons:
when the user has just bought a thermostat;
if a malfunction occurred, and the user is trying to find the cause. The user can access the configuration of the thermostat and perform a "redetect" to determine what has changed.
If the user is trying to connect a new system with an existing thermostat. This could be an altogether new system or an add-on system such as gas heating or an add on cooling system added to an existing system.

User Interface Input detection: The button-switch 128 available on the Smart base 114 enables the user to input control commands to the FPC system. This can be used in different situations, to make sure the user is able to control the air conditioner 104.

The internal memory 608 of the Smart base 114 has stored information (see FIG. 2) specifying responses which result from various types of switch depressions of the switch 128. This internal logic compares the mode in the which the Smart base 114 is presently operating, and then sets the next mode of the Smart base 114 dependent upon the press of the switch 128.

The internal logic also detects if a single quick press of switch has been provided, or a longer duration press has been provided by the user.

When the Smart base 114 is in standalone operation i.e. when the Smart base has lost communication to the Hub 112 and the Smart base 114 continues operation according to the last received settings (i.e. mode, set temperature etc.), the user is able to use the button switch 128 to change the FPC system mode (i.e. heat/cool). This allows the user to still control the air conditioner mode.

The user is also able to use the switch 128 to move between various air conditioning modes, and also to cause the Smart base 114 to enter/exit override mode.

User Interface output display: The LED 129 on the Smart base 114 depicts the mode in which the Smart base is currently operating. Information about LED colours, relating to the Smart base, is stored in the Smart base internal memory 608. At any particular time, the Smart base 114 refers to a look up table, which reflects the relationship between a current mode of operation and a corresponding LED colour. The Smart base 114 determines the current mode in which the Smart base 114 is operating, and the Look Up Table returns a value (colour) to be displayed by the Smart base LED 129. This process is repeated every time a mode changes in the Smart base 114 as well as, periodically, to make sure the correct LED colour is displayed corresponding to the current mode of the Smart base.

Fall back strategy: The internal memory 608 of the Smart base 114 stores information on how to deal with different failure modes of the FPC system. This is to make sure that the FPC system keeps on working in a reliable and acceptable manner for the user.

Figure 14:
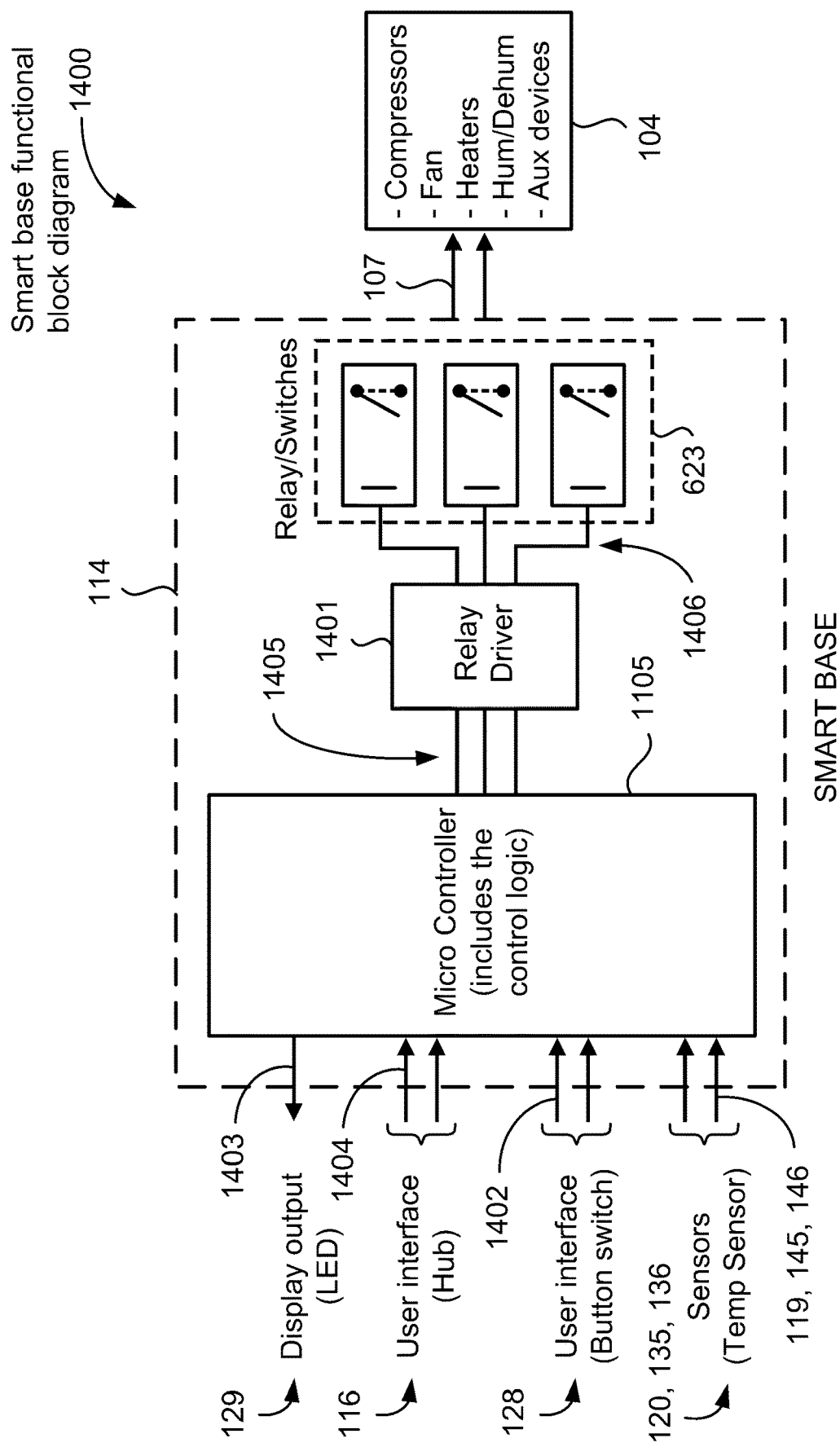
FIG. 14 is one example of how the Smart base module 114 is implemented.

FIG. 14 is one example of how the Smart base module 114 is implemented. The Smart base module 114 contains a processor 1105 (described hereinafter in more detail with reference to FIGS. 11A, 11B) which communicates control information 1403 with the LED display 129, communicates monitoring information 1402 with the user interface 128, and communicates sensor information 145, 146, 119 relating to the one or more environmental parameters 122 with the Smart base sensor 135, the Hub sensor 136 and the remote sensor 120 respectively. The controller 1105 also communicates control information 1404 with the Hub module 112 via the wireless interface 116. The controller 1105 communicates control information 1405 with a relay driver 1401 which communicates control information 1406 with a bank of relays/switches 623 (described hereinafter in more detail with reference to FIG. 6) which connects control signals to the air conditioner. Power connection 107 is the AC power to the Smart base, from the air conditioner.

Figure 10A:
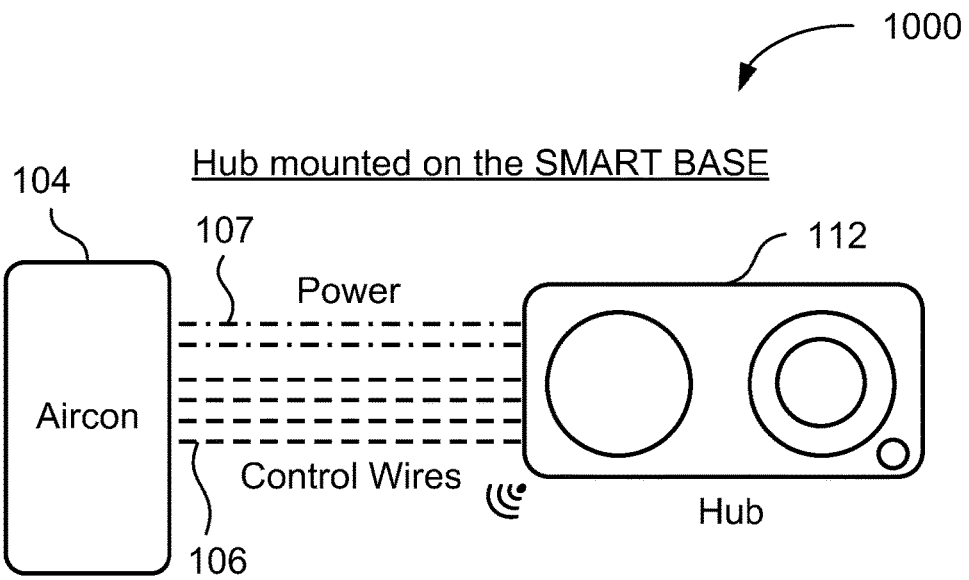
FIGS. 10A and 10B depict operation of the FPC arrangement.
Figure 10B:
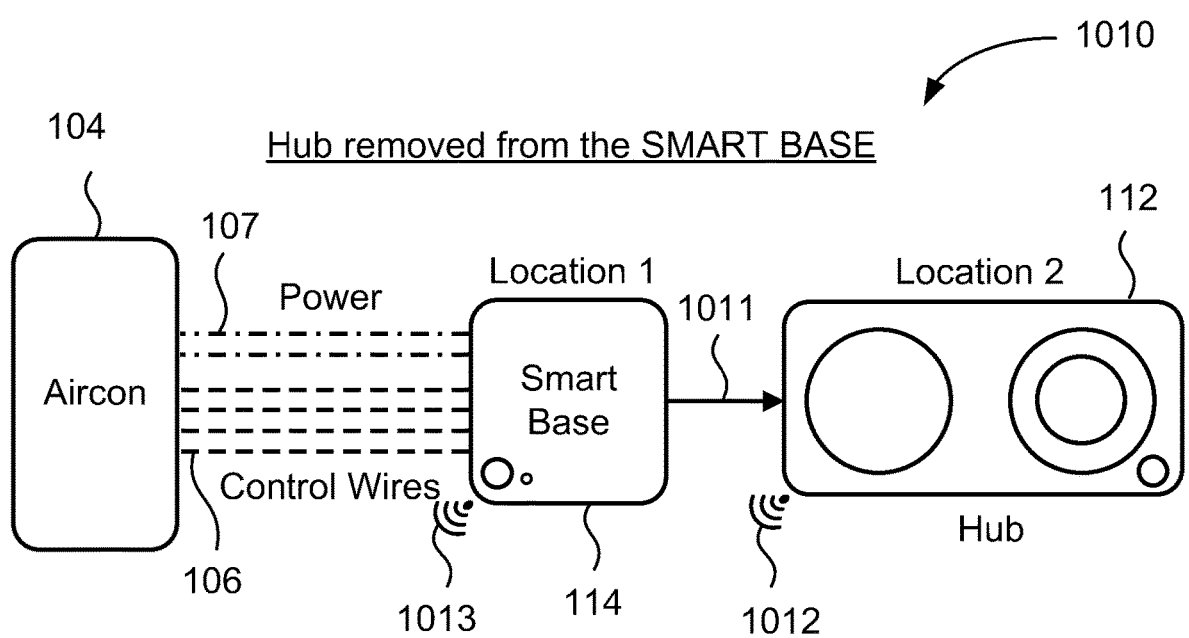

FIGS. 10A and 10B depict one example of operation of the FPC arrangement.

FIG. 10A depicts the Hub module 112 being co-located and docked with the Smart base module 114 (not visible). Power is provided (by the air conditioner 104) to the Smart base module 114 as depicted by the connection 107, and control communication between the air conditioner 104 and the Smart base module 114 (not visible) is depicted by connections 106. In this example, the Hub module 112 is controlling operation of the air conditioner 104.

FIG. 10B depicts the Hub module 112 in an undocked state from the Smart base module 114, and the Hub module 112 has been moved, as depicted by an arrow 1011 to a different location. The Hub module 112 is still controlling the air conditioner 104 by communicating wirelessly with the Smart base 114 as depicted by "wireless" icons 1012, 1013 (which depict the wireless communication 116).

Figure 16:
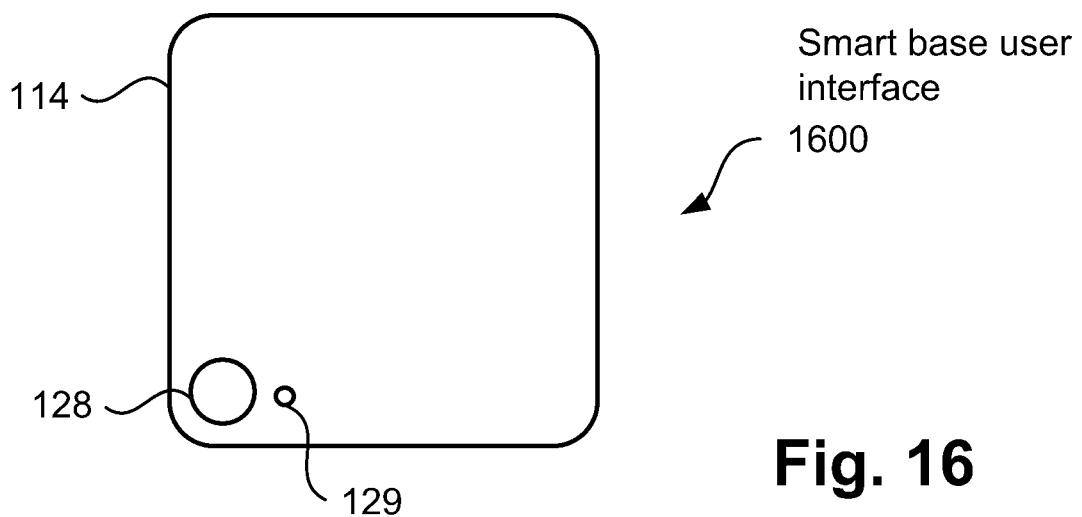
FIG. 16 is an example of a user interface arrangement which may be used by the Smart base module.

FIG. 16 is an example of a user interface arrangement which may be used by the Smart base module 114. In one FPC arrangement the user interface 128 is a tactile switch which provides the control signals 1402 (see FIG. 14) which enable a user to cycle through various air conditioner modes including heating, cooling, fan speeds and so on. The control signals 1402 (see FIG. 14) provided by the switch 128 also enable the user to perform a hardware reset, described in more detail below, which is used to reset the Smart base to factory settings.

The tactile switch 128 available on the Smart base 114 enables the user to input control commands to the air conditioning FPC system 100. This can be used in different situations, ensuring that the user can control the air conditioner 104.

The internal memory 608 of the Smart base 114 has stored a software application and information (referred to alternately as the Smart base logic) about the appropriate responses to a press of the switch 128. This Smart base logic considers the mode in which the Smart base is presently operating, and then it sets the next mode of the Smart base 114, dependent upon a subsequent press of the switch 128.

The Smart base logic also detects if it was a single quick press of the switch 128 or if the switch 128 was pressed for a longer duration.

When the Smart base 114 is in standalone operation i.e. when the Smart base 114 has lost wireless communication to the Hub 112 and the Smart base 114 continues operating with the current settings (mode, set temperature etc.), the user is able to use the switch 128 to change the FPC system operating mode (heat/cool). This capability enables the user to control the air conditioner mode.

The user can also place the Smart base 114 into override mode, by using the switch 128 on the Smart base 114. The user thus uses the switch 128 to transition between air conditioning modes, and also to bring the Smart base 114 out of the override mode, if required. The LED 129 on the Smart base depicts the mode of operation in which the Smart base is presently operating. Information about LED colours is stored in the Smart base internal memory 608.

At any time the Smart base logic can check a look up table which specifies the relationship between the current mode and the LED colours. The Smart base logic searches the lookup table for the current mode, and the Look Up Table returns a value (colour) to be displayed by the LED 129 of the Smart base 114. This process is repeated every time a mode changes in the Smart base 114. The process is also performed periodically to ensure that the correct LED colour is being displayed.

The FPC system provides user an ability to reset the FPC system to a factory state. This is required if the FPC system malfunctions, due to varied reasons. Reset brings the FPC system back to a known state which is the factory state.

The user may perform a reset of the FPC system under certain conditions. E.g. if the user is of the opinion that (a) the Smart base 114 is not responding to commands through the switch, (b) The LED 129 colour/blink doesn't correspond to the mode selected, (c) The Hub 112 cannot find the Smart base 114 through the wireless network, (d) the software in the Smart base 114 is not controlling the air conditioner 104 in an expected way.

In one FPC arrangement reset of the FPC system is initiated by the Smart base 114. The user needs to press and hold the switch 128 on the Smart base 114, in one FPC example. This will make the Smart base 114 go into reset mode. Consequently, all the current settings stored in the Smart base 114 working internal memory will be erased and the Smart base 114 will take default settings from its internal read only memory 608. The Smart base will then push the default settings to the Hub 112. Once the settings are synchronised between the devices, the Smart base 114 then commences operation in a default air conditioning mode with the default settings.

In another FPC arrangement, the Hub 112 pushes the default settings to the FPC system, if the FPC system reset is performed. This includes pushing the default settings to the Smart base 114.

As a consequence of the reset the Smart base 114 lose its wireless connectivity, and connection needs to be re-established with a Hub 112. The Smart base 114 will also lose any FPC system configuration data, i.e. the type of system, and will also lose the name given to it by the user. Account information stored in the cloud server 147 is not deleted as a result of the reset.

During the reset process, the user can be asked if they would like to delete the information in the cloud server 147, including the account information, wireless network information, and other settings stored in the cloud.

After the reset, the user follows the process of setting up a new Hub, and pairing devices to it. Although when the Hub is reset information and settings are lost as described above, the Hub 112 may still be able to retrieve historic configuration information from the cloud server 147. As the Hub 112 is connected to the cloud server 147 over the network 101, the Hub 112 continuously backs up the FPC system configuration as well as other data to the cloud server. Accordingly, when the Hub is powered ON after a reset, the user is presented with 2 options as follows:

Fresh start

Restore.

If the user choses a "fresh start", all the FPC system configuration as well as other network configuration is performed using default settings for the FPC system type settings. The user will need to setup a new Hub, with a new wireless network. The user may still be able to use the old account information, if it was not deleted in the reset process.

If the user selects the "restore" option, it is possible to restore the FPC system using the backed-up information stored on the cloud server 147. In one FPC example the indicator 129 is an RGB light emitting diode (LED) which indicates the current mode of the air conditioner (e.g. heating, cooling and so on).

Figure 15:
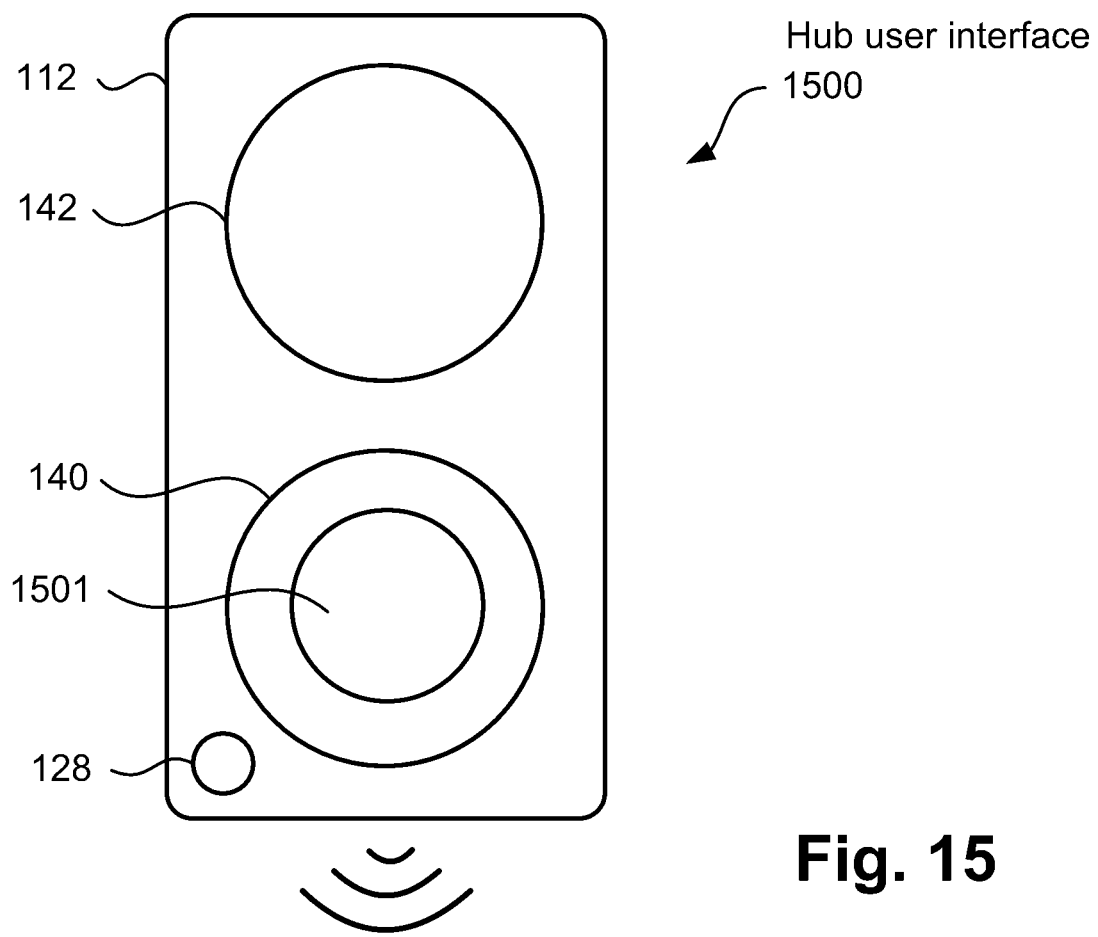
FIG. 15 is an example of a user interface arrangement which may be used by the Hub module.

FIG. 15 is an example of a user interface arrangement 1500 which may be used by the Hub module 112. In one FPC arrangement the user interface is a scroll wheel 140 which surrounds a tactile switch 1501. The display screen 142 enables a compact and intuitive graphical user interface (GUI) to be displayed. The scroll wheel 140 enables the user to navigate the GUI displayed on the display 142 and the tactile switch 1501 enables the user to select an item in the GUI and to perform a hardware reset. Audio feedback may also be provided (not shown).

Hardware reset: During the operation of the Hub 112, there may be instance/s where the user would like to reset the Hub 112. This may be required in situations where the user is of the opinion that:

The Hub 112 is not responding to commands through the switch 140 on the Hub 112;

Movement of the dial 140 does not operate as required;

The screen GUI 142 appears to be frozen at a particular screen, and/or is blurry/blank/strange colours etc;

The Hub 112 cannot find the Smart base 114 through the wireless network 155;

The software inside the Hub 112 is not controlling the FPC system in an expected way.

Recycling the power does not rectify the problem.

For a hardware reset of the Hub 112, the user needs to press and hold the tactile switch 1501 (within the dial 140) for more than 15 secs. This will cause the Hub hardware to reset. Consequently, all current settings stored in the Hub's working internal memory 801 will be erased and the Hub 112 will use the default settings stored in its internal read only memory Embedded Multimedia Card 803. The Hub 112 is then said to be reset. The Hub 112 forgets all the user settings and starts in a default Air conditioning mode.

With the reset, the Hub 112 also loses its wireless connection. This means that any information related with the wireless network, including the network name, device list etc. will be deleted (see "restore mode" below).

With the reset, the Hub 112 also loses FPC system configuration data (eg the type of system) and loses the name given to it by the user.

Account information, being stored in the cloud server 147, is not deleted on reset of the Hub 112. During the reset process, the user will be asked if they would like to delete the information in the cloud, including the account information, wireless network information, and other settings stored in the cloud.

After the Hub reset, the user follows the process of setting up a new Hub, and establishing wireless connectivity to devices with which it is to communicate.

Hub restore: Although the Hub 112 is reset, the Hub 112 may still be able to retrieve old configuration from the cloud server 147. As the Hub 112 is connected to the cloud server 147, it backs-up its FPC system configuration as well as other data to the cloud server 147. When the Hub is powered ON, after a reset, the user is presented with 2 options:

Fresh start

Restore.

If the user choses a fresh start, all the FPC system configuration as well as other network configuration is performed from scratch. The Hub 112 will start with default settings, for the FPC system type settings. The user will need to setup a new Hub, with a new wireless network. The user may still be able to use the old account information, if it was not deleted in the reset process.

There may be instances where the user does not want to delete all the information, including account information. Also, the user may want to revert to previous settings, after Hub reset. The restore process assists the user in this regard.

Figure 17:
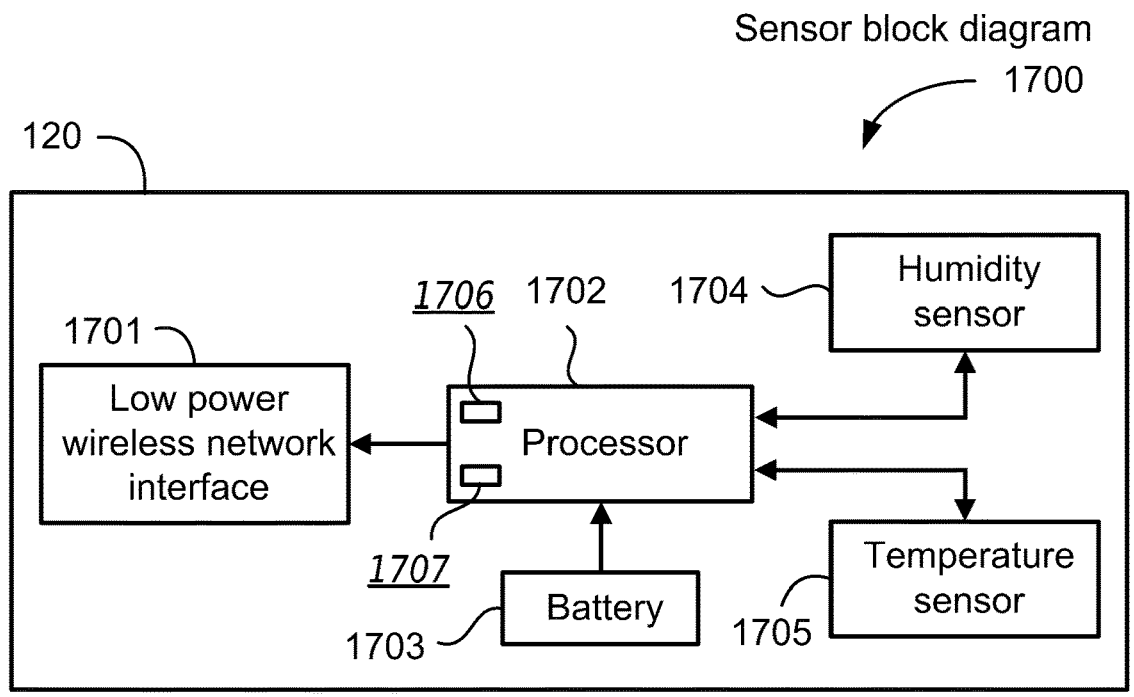
FIG. 17 is an example of a functional block diagram of a sensor module.

FIG. 17 is an example of a functional block diagram of a sensor module. The sensor 120 has a processor 1702 with an internal memory 1706 storing a software application 1707 for controlling operation of the sensor 120. The processor communicates with a low power wireless network interface 1701, a humidity sensor module 1704, a temperature sensor module 1705 and is powered by a battery 1703. The memory 1706 stores software and stored information configured to measure Temperature and Humidity and provide that data through the low power wireless network interface 1701 circuit to the Hub 112. A battery 1703 provides power to the sensor components 1701, 1702, 1704 and 1705. The low power wireless network interface 1701 is an electronic circuit that converts data from the processor 1702 to wireless signals for transmission over the wireless network to the Hub 112. The humidity sensor 1704 is a transducer that converts the environmental humidity to electronic signals which are converted to humidity values, by the processor 1702. The temperature sensor 1706 is a transducer that converts the environmental temperature to electronic signals which are converted to temperature values, by the processor 1702.

In an FPC system, several sensors are available, giving flexibility to the customer, to control their FPC system from different points. The location of the sensors can be different, allowing the customer to measure temperatures and other environmental parameters such as humidity from different locations. The remote sensor 120 shown in the present example of the FPC system is a battery powered temperature and humidity sensor, using wireless communication as depicted by the dashed arrow 119, which can be placed by the user anywhere in the house/property provided the sensor 120 is within the wireless network range. The sensor 120 provides flexibility to the user in installation/wiring as the user can locate the sensor wherever desired provided it is in range of the wireless network.

The remote sensor 120 example described herein is powered by a battery and does not have a user interface. In order to configure the remote sensor 120, the user uses the GUI (140, 142, 1501) of the Hub 112. The Hub 112 can communicate with the remote sensor 120 through the wireless network 155, as long as the sensor 120 is within range and has sufficient battery power. The user needs to go to the Hub 112 to determine the status and configuration of the sensor 1120.

Sensor readings from the remote sensor 120 can be used alone, or in combination with sensor readings from other temperature sensors 136, 135 in the FPC system 100. The selection of which sensors to be used can be selected through the GUI of the Hub 112.

The user is able to average or select weighted averaging of the temperature sensors 120, 136, 135. This provides significant flexibility in controlling the space temperature. In one configuration, operation of the remote sensor 120 uses wireless communication over the wireless network 155 to provide sensor readings to the Hub 112.

Normal operation: Normal operation for the remote sensor is defined as, when, the remote sensor is connected to the low power wireless network 155, and the Hub 112 can communicate with the sensor 120 and get information from it.

Abnormal operation: Abnormal operation of the remote sensor 120 would constitute one of the following:

Sensor not responding due to battery loss, physical damage etc;

Sensor not responding due to software malfunction;

Sensor not responding as it is out of range; or

Sensor has lost the wireless network connectivity.

Figure 11A:
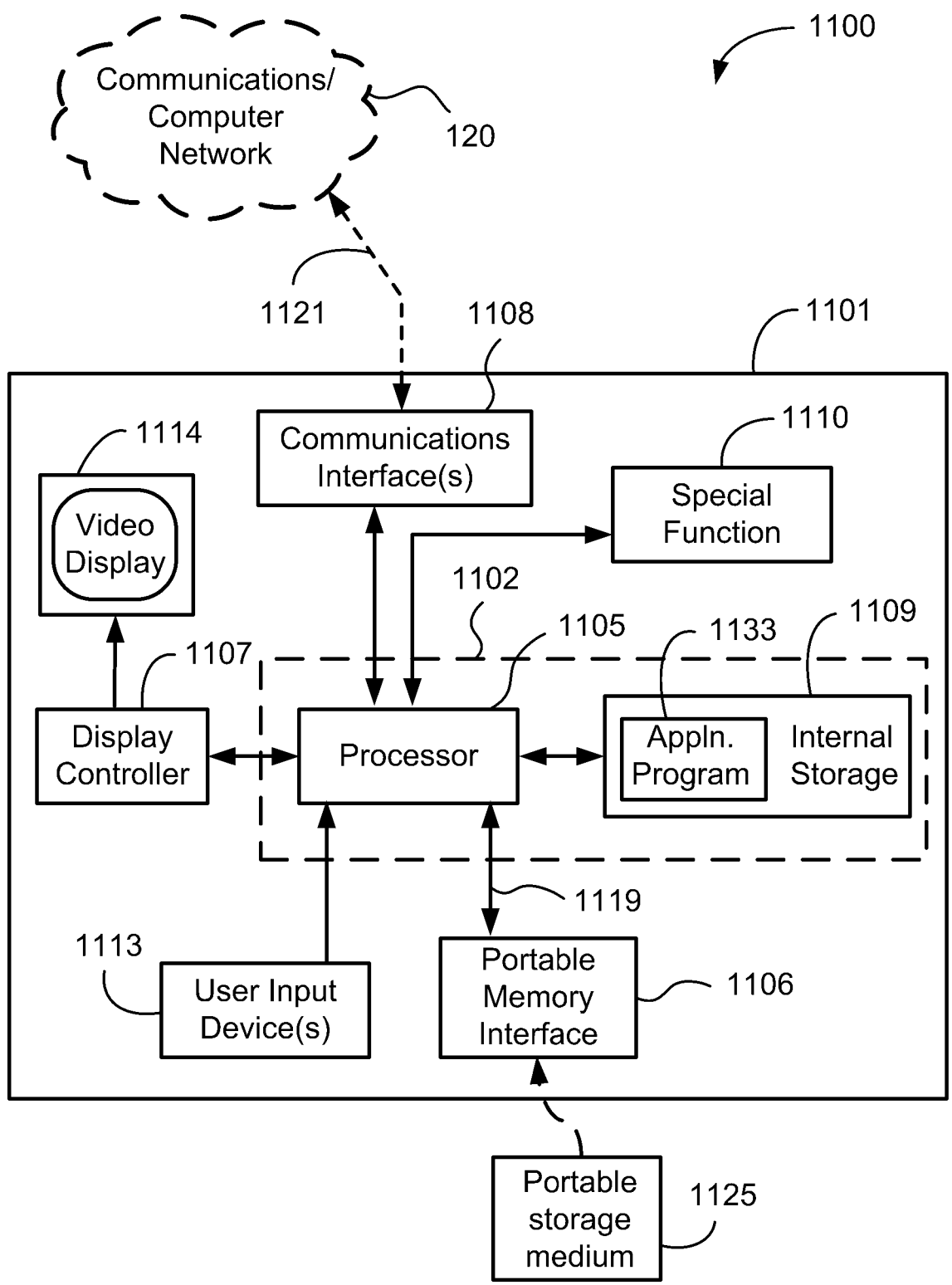
FIGS. 11A and 11B collectively form a schematic block diagram representation of an electronic device upon which described arrangements can be practised.
Figure 11B:
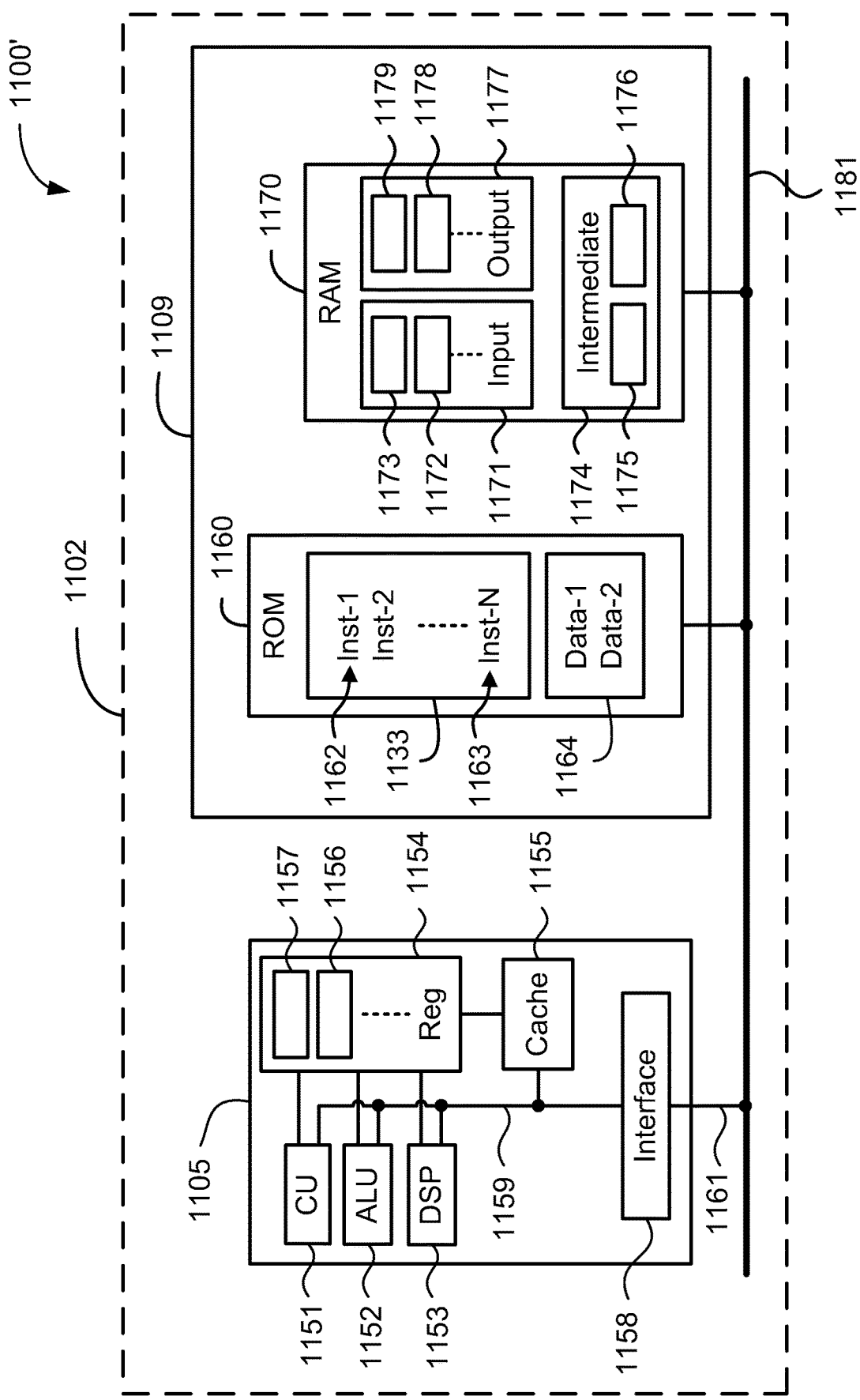

FIGS. 11A and 11B collectively form a schematic block diagram representation of an electronic device upon which described arrangements can be practised.

FIGS. 11A and 11B collectively form a schematic block diagram of a general purpose electronic device 1101 including embedded components, upon which the FPC methods to be described are desirably practiced. In particular, one or more of the Smart base 114 and the Hub module 112 may be implemented using such an electronic device 1101. General descriptions of how the FPC arrangement operates are described with reference to FIGS. 6 and 7 (for the Smart base module 114) and FIGS. 8 and 9 (for the Hub module 112). The electronic device 1101 is referred to in FIGS. 6 and 8 using the reference numerals 1101SBM (when referred to in the context of the Smart Base Module), and 1101HM (when referred to in the context of the Hub Module). The FPC software application program 1133 is referred to in FIGS. 6 and 8 using the reference numerals 1133SBM (when referred to in the context of the Smart Base Module), and 1133HM (when referred to in the context of the Hub Module).

A more detailed description of how the device 1101 operates is provided in relation to the following FIGS. 11A and 11B.

As seen in FIG. 11A, the electronic device 1101 comprises an embedded controller 1102. Accordingly, the electronic device 1101 may be referred to as an "embedded device." In the present example, the controller 1102 has the processing unit (or processor) 1105 which is bi-directionally coupled to an internal storage module 1109. The storage module 1109 may be formed from non-volatile semiconductor read only memory (ROM) 1160 and semiconductor random access memory (RAM) 1170, as seen in FIG. 11B. The RAM 1170 may be volatile, non-volatile or a combination of volatile and non-volatile memory.

The electronic device 1101 includes a display controller 1107, which is connected to a video display 1114, such as a liquid crystal display (LCD) panel or the like (e.g. see the display 142 in the Hub module 112). The display controller 1107 is configured for displaying graphical images on the video display 1114 in accordance with instructions received from the embedded controller 1102, to which the display controller 1107 is connected.

The electronic device 1101 also includes user input devices 1113 which are typically formed by keys, a keypad or like controls (e.g. see the user interfaces 128 for the Smart base module 114, and the user interface 140, 1501 for the Hub module 112). In some implementations, the user input devices 1113 may include a touch sensitive panel physically associated with the display 1114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 11A, the electronic device 1101 also comprises a portable memory interface 1106, which is coupled to the processor 1105 via a connection 1119. The portable memory interface 1106 allows a complementary portable memory device 1125 to be coupled to the electronic device 1101 to act as a source or destination of data or to supplement the internal storage module 1109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 1101 also has a communications interface 1108 to permit coupling of the device 1101 to a computer or communications network 1120 via a connection 1121 (e.g. see the connection 116 between the Hub module 112 and the Smart base module 114, the Wi-Fi wireless connection 108 between the Hub module 112 and the router 103, and the connection 119 between the remote sensor 120 and the Hub module 112). The connection 1121 may be wired or wireless. For example, the connection 1121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 1101 is configured to perform some special function. The embedded controller 1102, possibly in conjunction with further special function components 1110, is provided to perform that special function (the special function components 1110 can, for example, comprise modules 601, 604, 606, 608, 610, 613, 623 and 618 in the Smart base module. Alternately and/or in addition the special function components 1110 can, for example, comprise modules 801, 803, 805, 807, 809, 812, 815, 817, 820, 822, 824, 826 and 828 in the Hub module 112). The special function components 1110 is connected to the embedded controller 1102.

The FPC methods described hereinafter may be implemented using the embedded controller 1102, where the processes of FIGS. 3-5 and 12 may be implemented as one or more software application programs 1133 executable within the embedded controller 1102. The software application programs 1133 may comprise the software modules 704, 707 and 709 in the Smart base module 114. Alternately and/or in addition, the software application programs 1133 may comprise the software modules 901, 911, 914, 903, 905, 907, 916, 918, 920, 910 and 922 in the Hub module 112. Alternately and/or in addition, the software application programs 1133 may comprise software modules (not shown) in the remote sensor 120.

The electronic device 1101 of FIG. 11A implements the described FPC methods. In particular, with reference to FIG. 11B, the steps of the described FPC methods are effected by instructions in the software 1133 that are carried out within the controller 1102 in the Smart base module 114 and/or the Hub module 112 and/or the remote sensor 120. The software instructions may be formed as one or more code modules, each for performing one or more particular tasks. The software may also be divided into two separate parts, in which a first part and the corresponding code modules performs the described FPC methods and a second part and the corresponding code modules manage a user interface between the first part and the user.

The software 1133 of the embedded controller 1102 is typically stored in the non-volatile ROM 1160 of the internal storage module 1109. The software 1133 stored in the ROM 1160 can be updated when required from a computer readable medium. The software 1133 can be loaded into and executed by the processor 1105. In some instances, the processor 1105 may execute software instructions that are located in RAM 1170. Software instructions may be loaded into the RAM 1170 by the processor 1105 initiating a copy of one or more code modules from ROM 1160 into RAM 1170. Alternatively, the software instructions of one or more code modules may be pre-installed in a non-volatile region of RAM 1170 by a manufacturer. After one or more code modules have been located in RAM 1170, the processor 1105 may execute software instructions of the one or more code modules.

The application program 1133 is typically pre-installed and stored in the ROM 1160 by a manufacturer, prior to distribution of the electronic device 1101 (as noted the application program 1133 and associated processors may be distributed between the Smart base 114, the Hub module 112 and the one or more remote sensors 120). However, in some instances, the application programs 1133 may be supplied to the user encoded on one or more CD-ROM (not shown) and read via the portable memory interface 1106 of FIG. 11A prior to storage in the internal storage module 1109 or in the portable memory 1125. In another alternative, the software application program 1133 may be read by the processor 1105 from the network 1120, or loaded into the controller 1102 or the portable storage medium 1125 from other computer readable media. Computer readable storage media refers to any non-transitory tangible storage medium that participates in providing instructions and/or data to the controller 1102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1101. Examples of transitory or non-tangible computer readable transmission media that may also participate in the provision of software, application programs, instructions and/or data to the device 1101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 1133 and the corresponding code modules mentioned above may be executed to implement one or more graphical user interfaces (GUIs) to be rendered or otherwise represented upon the display 1114 of FIG. 11A (e.g. the display 142 of the Hub module 112). Through manipulation of the user input device 1113 (e.g., the keypad) (see also the user interfaces 128 of the Smart base module 114, and the user interface modules 140, 1501 of the Hub module 112), a user of the device 1101 (i.e. a user of the Smart base module 114 and the Hub module 112) and the application programs 1133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 11B illustrates in detail the embedded controller 1102 having the processor 1105 for executing the application programs 1133 and the internal storage 1109. The internal storage 1109 comprises read only memory (ROM) 1160 and random-access memory (RAM) 1170. The processor 1105 is able to execute the application programs 1133 stored in one or both of the connected memories 1160 and 1170. When the electronic device 1101 is initially powered up, a system program resident in the ROM 1160 is executed. The application program 1133 permanently stored in the ROM 1160 is sometimes referred to as "firmware". Execution of the firmware by the processor 1105 may fulfil various functions, including processor management, memory management, device management, storage management and user interface.

The processor 1105 typically includes a number of functional modules including a control unit (CU) 1151, an arithmetic logic unit (ALU) 1152, a digital signal processor (DSP) 1153 and a local or internal memory comprising a set of registers 1154 which typically contain atomic data elements 1156, 1157, along with internal buffer or cache memory 1155. One or more internal buses 1159 interconnect these functional modules. The processor 1105 typically also has one or more interfaces 1158 for communicating with external devices via system bus 1181, using a connection 1161.

The application program 1133 includes a sequence of instructions 1162 through 1163 that may include conditional branch and loop instructions. The program 1133 may also include data, which is used in execution of the program 1133. This data may be stored as part of the instruction or in a separate location 1164 within the ROM 1160 or RAM 1170.

In general, the processor 1105 is given a set of instructions, which are executed therein. This set of instructions may be organised into blocks, which perform specific tasks or handle specific events that occur in the electronic device 1101. Typically, the application program 1133 waits for events and subsequently executes the block of code associated with that event. Events may be triggered in response to input from a user, via the user input devices 1113 of FIG. 11A, as detected by the processor 1105. Events may also be triggered in response to other sensors and interfaces in the electronic device 1101.

The execution of a set of the instructions may require numeric variables to be read and modified. Such numeric variables are stored in the RAM 1170. The disclosed method uses input variables 1171 that are stored in known locations 1172, 1173 in the memory 1170. The input variables 1171 are processed to produce output variables 1177 that are stored in known locations 1178, 1179 in the memory 1170. Intermediate variables 1174 may be stored in additional memory locations in locations 1175, 1176 of the memory 1170. Alternatively, some intermediate variables may only exist in the registers 1154 of the processor 1105.

The execution of a sequence of instructions is achieved in the processor 1105 by repeated application of a fetch-execute cycle. The control unit 1151 of the processor 1105 maintains a register called the program counter, which contains the address in ROM 1160 or RAM 1170 of the next instruction to be executed. At the start of the fetch execute cycle, the contents of the memory address indexed by the program counter is loaded into the control unit 1151. The instruction thus loaded controls the subsequent operation of the processor 1105, causing for example, data to be loaded from ROM memory 1160 into processor registers 1154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 1133, and is performed by repeated execution of a fetch-execute cycle in the processor 1105 or similar programmatic operation of other independent processor blocks in the electronic device 1101.

Figure 6:
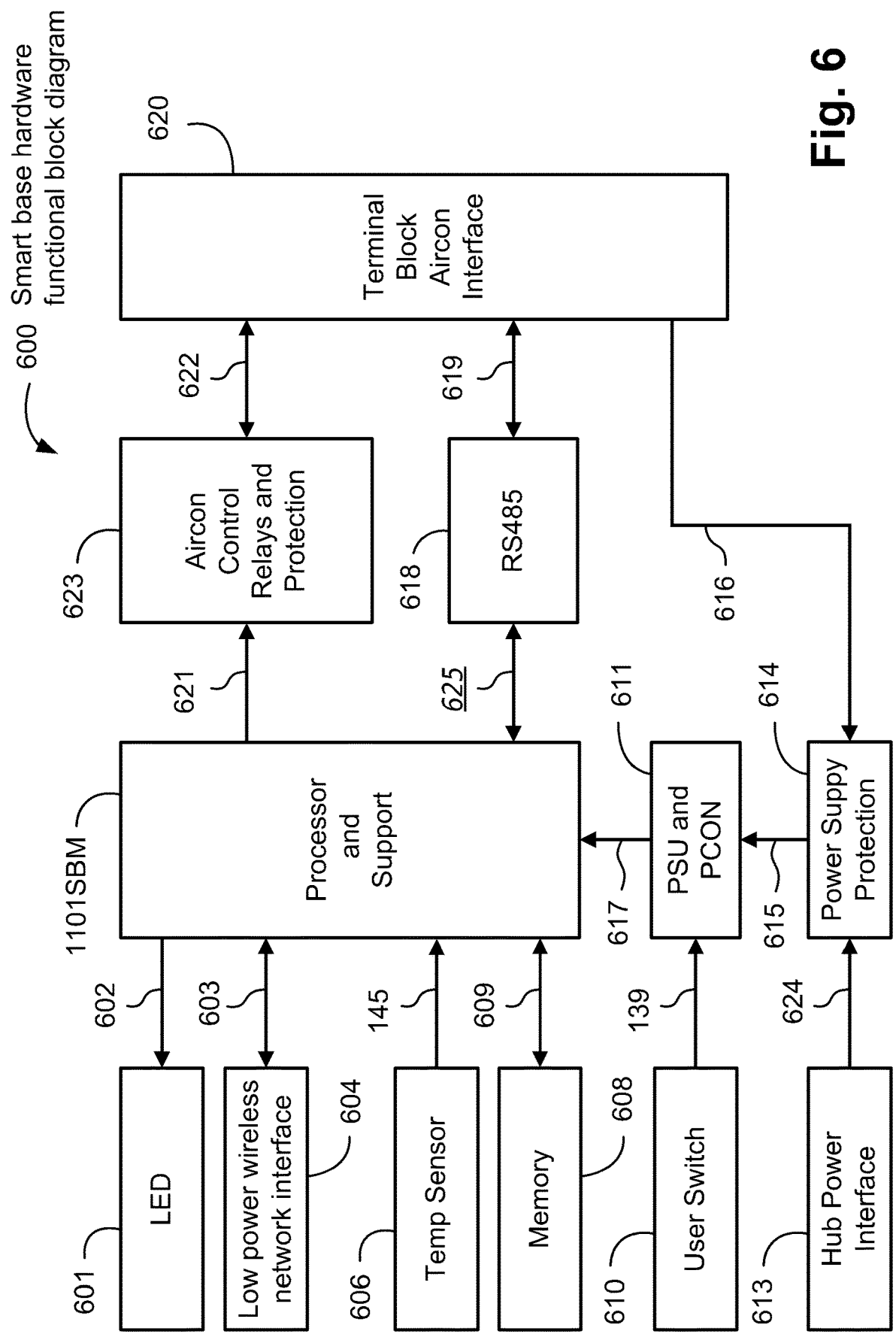
FIG. 6 is an example of a functional hardware block diagram which may be used to implement a Smart base module.

FIG. 6 is an example of a functional hardware block diagram which may be used to implement the Smart base module 114. A processor and support module 1101SBM (see FIG. 11A) communicates, as depicted by an arrow 602, with an LED indicator 601 (see 129 in FIG. 1 and FIG. 14). The processor and support module 1101SBM communicate, as depicted by an arrow 603, with a low power wireless network interface 604 of the wireless communication network 155.

The processor and support module 1101SBM communicate, as depicted by an arrow 145, with a temperature sensor 606 (see 135 in FIG. 1 and FIG. 14). The processor and the support module communicate with the temperature sensor. The arrow depicts the flow of information. This information is the temperature sensor value which the processor and support module 1101SBM periodically receive from the temperature sensor 606 through the connection 145, to ensure that it always has the current value of the temperature.

The processor and support module 1101SBM communicates, as depicted by an arrow 609, with a memory module 608. The memory 608 is where the information is stored in the Smart base module 114. There are different types of memories according to the function they perform. There is the permanent memory which stores the main program that runs every time the Smart base 114 is powered up. The Smart base 114 also has settings stored in the memory 608, requested by the user called the user settings. These settings depict the boundaries within which the FPC system needs to operate, as per the user. Another memory which is a volatile memory, is the memory which the processor and the support module 1101SBM uses for implementing commands, generating outputs from inputs etc. The connection 609 shows communication in both directions, as the data flows both ways.

The processor and support module 1101SBM communicates, as depicted by an arrow 617, with a PSU and PCON 611. The PSU is the Power Supply Unit and the PCON is the Power Controller. These 2 modules form part of the power supply section of the Smart Base Module 114. The main function of the PSU and PCON is to provide power to the components on the Smart Base Module 114. The connection 617 between the Processor and Support 1101SBM and the PSU and PCON 611 is unidirectional and indicates that the Processor and Support 1101SBM gets information from the PSU and PCON.

The PSU and PCON 611 communicates, as depicted by an arrow 139, with a user switch 610 (see 128 in FIG. 1). The connection 139 between the switch 610 and PSU and PCON 611 depicts the direction of data flow between the switch 610 and PSU and PCON 611. This shows that switch 610 provides information requested by the PSU and PCON 611.

The processor and support module 1101SBM communicates, as depicted by an arrow 621, with Aircon Control Relays and protection module 623. As in FIG. 14, the Aircon Control Relays and Protection module consists of the Relays 623 as well as protection circuitry. In FIG. 14 Relay Driver 1401, which is connected with relays 623 through connection 1406, forms part of the Processor and Support 1101SBM. The Relay Driver 1401 is connected with the Microcontroller module 1105, through the connection 1405. As per connection 621 between Processor and Support 1101SBM and Aircon Control Relays & Protection 623, the flow of information is one way and towards the Aircon Control Relays & Protection 623.

The processor and support module 1101SBM communicates, as depicted by an arrow 625, with an RS 485 module 618. The RS485 module 618 provides an interface between the Smart Base Module 114 and the external devices. As in FIG. 6, the RS485 module 618 is connected to the Processor and support module 1101SBM through the connection 625. The RS485 module 618 provides the physical hardware, to connect the Smart Base Module 114 with external devices. As per one FPC arrangement, the Smart Base Module 114 can connect and communicate with other external devices through the RS485 module 618. The RS485 module 618, acts as an interface between the Processor and Support Module 1101SBM and the Terminal Block—Aircon Interface 620 through which the Processor and Support Module 1101SBM can communicate with external devices. The connection 625 shows communication in both directions. i.e. the communication can happen both from the RS485 module 618 to the Processor and Support module 1101SBM and from the Processor and Support module 1101SBM to the RS485 module 618.

The action and control relays module 623 communicates, as depicted by an arrow 622, with a terminal block—Aircon interface 620. As per FIG. 6 the Aircon Control Relays & Protection 623 is connected to the Terminal block—Air con Interface 620 through the connection 619. The function of the Terminal block—Air con Interface 620 is to provide external connections to devices and systems. Thus, for example, the HVAC system 104 connects to the Smart Base module 114 through the Terminal block—Air con Interface 620. Any external device that is to be connected to the RS485 module 618 connects through the Terminal block—Air con Interface 620.

The RS 485 module 618 communicates, as depicted by an arrow 619, with the terminal block—action interface module 620. The connection 619 depicts bidirectional communication indicating that the RS485 module 618 can receive the information from the Terminal Block-Aircon Interface 620 and also, can send the information to the Terminal Block-Aircon Interface 620.

The terminal block—action interface module 620 communicates, as depicted by an arrow 616, with a power supply protection module 614. The connection 616 depicts a unidirectional flow of information. This means that the information only flows from the Terminal Block—Aircon Interface 620 to the Power Supply Protection module 614. The external device when connected to the Terminal Block—Aircon Interface 620 provides power to the Smart base module 114. The power from the Terminal Block—Aircon Interface 620 is connected to the Power Supply Protection module 614. The Power Supply Protection module 614 ensures that the power connected is within the range required and will not cause any damage to the Smart Base module 114.

The power supply protection module 614 communicates, as depicted by an arrow 615, with the PSU and PCON module 611. The connection 615 depicts the flow of information between the Power Supply Protection module 614 and the PSU and PCON module 611. The connection 615 shows a unidirectional flow from the Power Supply Protection module 614 to the PSU and PCON module 611. The Power Supply Protection module 614, through the connection 615 provides power to the PSU and PCON module 611. This power allows the PSU and PCON module 611 to have enough power to perform its functions.

A Hub power interface 613 communicates, as depicted by an arrow 624, with the power supply protection module 614. The Hub Power Interface 613 is the physical connection between the Hub 112 and the Smart Base 114. The Hub Power Interface 613 allows the power flow from the Smart base 114 to the Hub 112. The connection 624 between the Power Supply Protection 614 and the Hub Power Interface 613, shows the direction of flow of power, as the Hub 112 is powered by the Smart Base 114. The Power Supply Protection module 614 ensures that the power provided to the Hub 112 is within specified power range of the Hub 112 and the Power Supply Protection module 614 protects the Hub 112 in this way.

Figure 7:
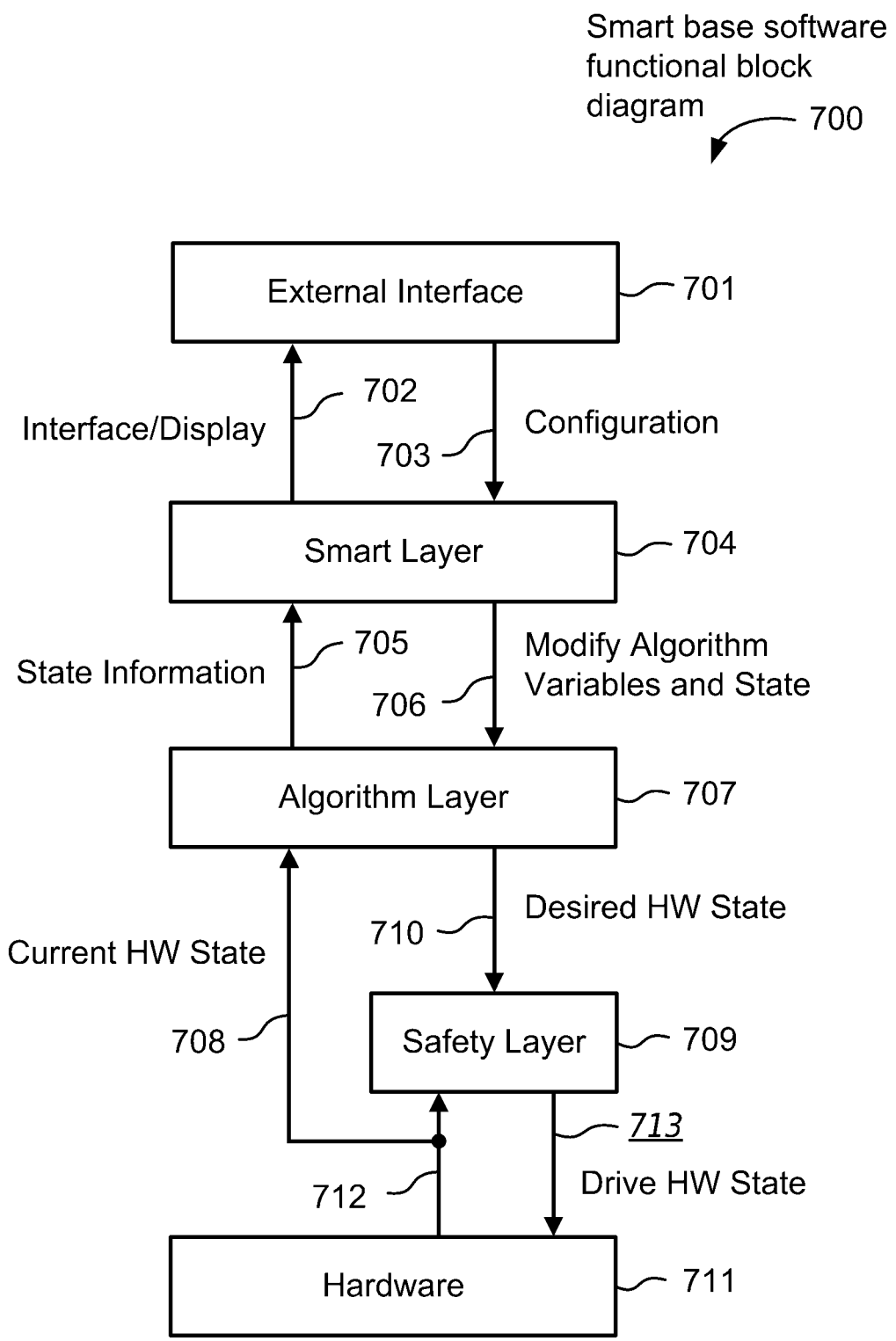
FIG. 7 is an example of a functional software block diagram which may be used to implement a Smart base module.

FIG. 7 is an example of a functional software block diagram which may be used to implement the Smart base module 114. An external interface module 701 receives, as depicted by an arrow 702, interface/display information from a Smart layer module 704. The External Interface module 701 includes all the interface devices on the Smart Base 114. These interface devices provide the interface between the Smart Base 112 and the user. The interface devices available on the Smart Base 112 include the LED 129 (see FIG. 1) and the Switch 128 (see FIG. 1). The connection 702 shows the flow of information between the External Interface module 701 and the Smart Layer module 704. The External Interface module 701 receives the information from the Smart Layer module 704 through the connection 702. This information is the state and colour info of the LED 129 (see FIG. 1).

The external interface module 701 communicates, as depicted by an arrow 703, configuration information to the Smart layer module 704. The External Interface module 701 includes all the interface devices on the Smart Base 114. These interface devices provide the interface between the Smart Base 112 and the user. The interface devices available on the Smart Base 112 are the LED 129 (see FIG. 1) and the Switch 128 (see FIG. 1). The connection 703 shows the flow of information between the External Interface module 701 and the Smart Layer module 704. The External Interface module 701 outputs the information to the Smart Layer module 704 through the connection 703. This information is output from the Switch 128. When the user presses the Switch 128, that information is passed onto the Smart Layer module 704 through the connection 703. The information is the press of switch.

The Smart layer module 704 receives, as depicted by an arrow 705, state information from an algorithm layer 707. The connection 705 depicts the flow of information between Smart Layer module 704 and Algorithm Layer 707. The flow is from the Algorithm layer module 707 to the Smart Layer module 704. The Algorithm layer 707 provides the state information to the Smart Layer 704. This state information is the state of the FPC system at a particular time, for example the FPC system mode. The state information passed on to the Smart Layer 704 is passed on to the External Interface 701 in order to display on the interface device 129 (see FIG. 1).

The Smart layer module 704 communicates, as depicted by an arrow 706, modify information to the algorithm layer module 707. The connection 706 depicts the flow of information, which is from the Smart Layer 704 to the Algorithm Layer 707. The Smart Layer 704 receives configuration information from the External Interface 701, which the user provides through the Interface device 128 (see FIG. 1). Based on this configuration information, the Smart Layer 704 modifies the variables in the Algorithm Layer 707 as well as the state of the FPC system.

The algorithm layer module 707 receives, as depicted by an arrow 708, current hardware state information from a hardware module 711. The connection 708 depicts the flow of information between the Algorithm Layer 707 and the Hardware module 711. The Algorithm Layer 707, through the connection 708, reads the current hardware state of the Hardware module 711. This information gives the current status of the hardware. The Algorithm layer 707 can then compare this with the information from the Smart Layer 704, to generate the desired Hardware state.

The algorithm layer module 707 communicates, as depicted by an arrow 710, desired hardware state information to a safety layer 709. The connection 710 depicts the flow of information between the Algorithm layer 707 and the Safety layer 709. The Algorithm layer 707, after getting input from the Smart layer 704 about the state required by the user, and the current Hardware state from the Hardware module 711 generates the desired HW state. The desired HW state depicts what the user wants.

The safety layer module 709 receives, as depicted by an arrow 712, current hardware state information from the hardware module 711. The connection 712 depicts the flow of information between the Safety Layer module 709 and Hardware module 711. As an input, the Safety layer 709 receives the current state of the Hardware from the Hardware module 711.

The safety layer module 709 communicates, as depicted by an arrow 713, drive hardware state information to the hardware layer 711. The connection 713 depicts the flow of information between the Safety Layer 709 and the Hardware layer 711. The Safety layer module 709 provides the desired Hardware state information to the Hardware module 711, calculated with inputs from the Algorithm layer 707 and the Current Hardware state from the hardware layer 711. The Hardware module 711 sets the Hardware state, as per the desired Hardware state from the Safety layer 709.

Figure 8:
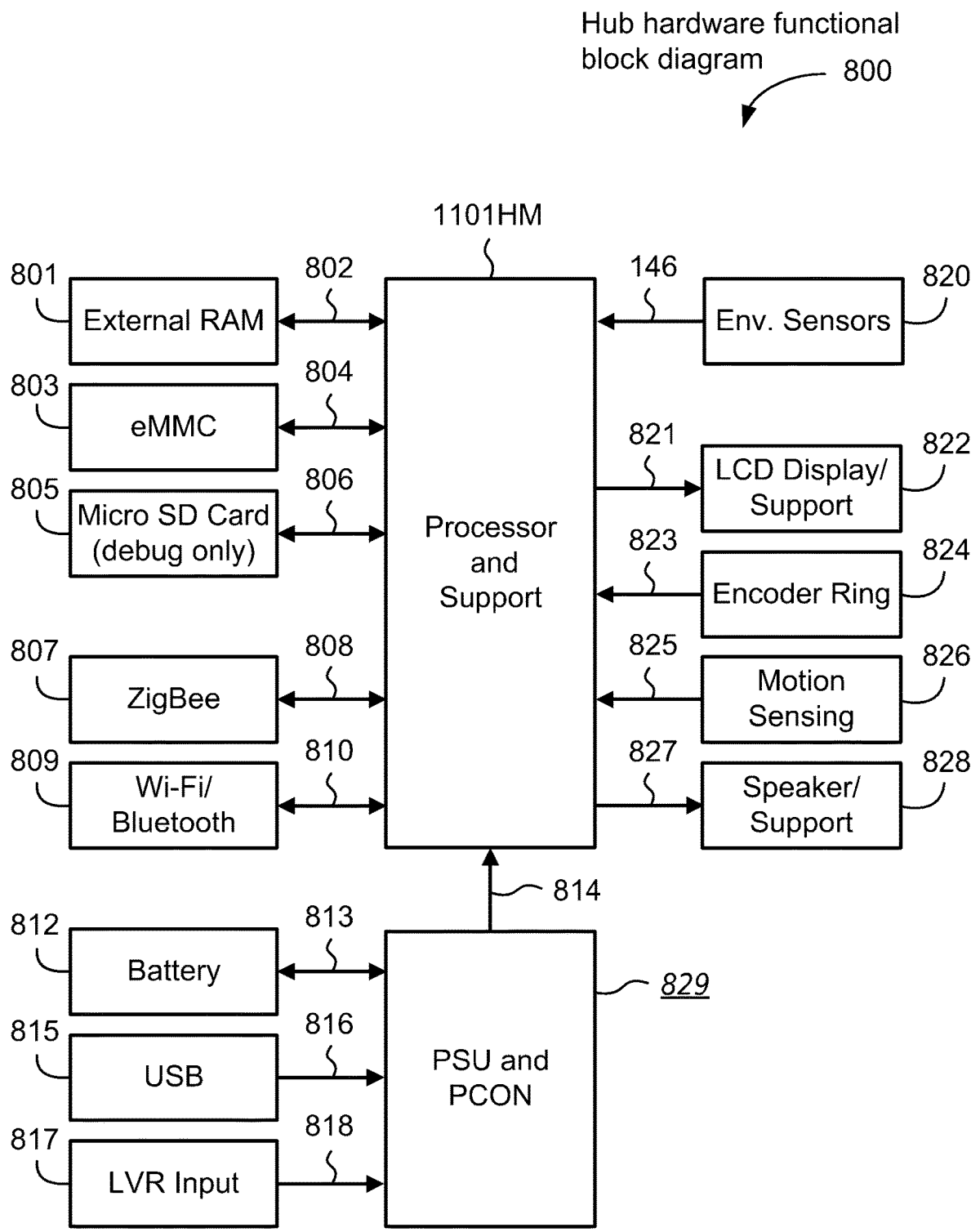
FIG. 8 is an example of a functional hardware block diagram which may be used to implement a Hub module.

FIG. 8 is an example of a functional hardware block diagram which may be used to implement the Hub module 112. A processor and support module 1101HM (see FIG. 11A) communicates, as depicted by an arrow 802, with an external RAM 801. The connection 802 depicts a bidirectional flow of information between the External RAM 801 and the Processor and Support module 1101HM. The Processor and Support module 1101HM reads from, as well as writes to, the information/variables it requires in order to process the commands required for an operation on data.

The processor and support module 1101HM communicates, as depicted by an arrow 804, with an eMMC module 803. The connection 804 depicts the bidirectional flow of information between the eMMC 803 and the Processor and Support module 1101HM. The Processor and Support module 1101HM reads from, as well as writes to, the information/variables, it requires to process the commands required for an operation on data.

The processor and support module 1101HM communicates, as depicted by an arrow 806, with a micro-SD card 805. The connection 806 depicts a bidirectional flow of information between the Micro SD Card 805 and the Processor and Support module 1101HM. The Processor and Support module 1101HM reads from, as well as writes to, the information/variables, it requires to process the commands required for an operation on data. This interface is only used for debug purposes. The Micro SD Card 805 can be used to update firmware to the device.

The processor and support module 1101HM communicates, as depicted by an arrow 808 with, for example, a Zigbee module 807. The connection 808 depicts a bidirectional flow of information between the Zigbee module 807 and the Processor and Support module 1101HM. The Zigbee module converts the information from the Processor and Support module 1101HM to Radio Frequency (RF). The information is then communicated with other modules in the FPC system via the low power network 155. Any information received from other modules through the RF is converted to a form that can be sent to the Processor and Support module 1101HM. In this way, through the Zigbee module 807, the Processor and Support module 1101HM (which forms part of Smart base 112) is able to communicate with other RF modules in the other components of the FPC system 100 which communicate over the low power wireless network 155.

The processor and support module 1101HM communicate, as depicted by an arrow 810, with a Wi-Fi/Bluetooth module 809. The connection 810 depicts a bidirectional flow of information between the Wi-Fi-Bluetooth module 810 and the Processor and Support module 1101HM. The Wi-Fi/

Bluetooth module 810 converts the information from the Processor and Support module 1101HM to Wi-Fi wireless signals (2.4 GHz). The Hub 114 can use standard wireless protocols (such as Wi-Fi and/or Bluetooth) to communicate the information over the wireless network 155. The information is then sent to other modules in the FPC system using the wireless network 155. The other modules can be other Hubs 114 and or a device such as the Router 103. The Wi-Fi network connection 108 can then be used to transmit information.

Any information received from other modules (i.e. the Hubs 114 or the Router 103 through the Wi-Fi network connection 108) is converted to a form that can be sent to the Processor and Support module 1101HM. This conversion is done by the Wi-Fi/Bluetooth module 809 and the information is sent through the connection 810.

The processor and support module 1101HM communicates, as depicted by an arrow 815, with a PSU and PCON module 829. The PSU and PCON module 829 is the device that supplies power to the Processor and Support module 1101HM and other modules in the Hub 112. The PSU and PCON module 829 is made up of power conversion and protection circuitry that takes power from USB module 815 through the connection 816 or LVR input module 817, through the connection 818 or from the battery module 812, through the connection 813. The circuitry in the PSU and PCON module 829 can also provide power to the battery module 812 through the connection 813. The PSU and PCON module 829 can get the power from USB module 815 or LVR Input module 817. The aim of the PSU and PCON module 829 is to provide the required power, within the specified range, and also to protect the Hub 114 from over/under voltages and short circuits. The PSU and PCON module 829 provide power to the Processor and Support module 1101HM through the connection 814.

The PSU and PCON module 829 communicates, as depicted by an arrow 813, with a battery module 812. The connection 813 depicts a bidirectional flow of information, between the Battery module 812 and the PSU and PCON module 829. The PSU and PCON module 829 can source power from either the USB module 815, through the connection 816, or from the LVR Input module 817 through the connection 818. The PSU and PCON module 829 uses one of these modules and can then allow power through the connection 813 to charge the battery through the Battery module 812. If neither of the USB module 815 or the LVR input module 817 is available, the PSU then sources the power from the Battery module 812, through the connection 813, to supply power to the Processor and Support module 1101HM.

The PSU and PCOM module 829 communicate, as depicted by an arrow 816, with a USB module 815. The connection 816 shows a unidirectional flow of information between the USB module 815 and the PSU and PCON module 829. The connection 816 shows that the power flows from the USB module 815 to the PSU and PCON module 829. In-built circuitry in the PSU and PCON module 829 allows the USB module 815 to supply power if the LVR input module 817 is not able to supply the power. The USB module 815 consists of associated circuitry to allow a USB connection through the USB-C connection, to the Hub 114.

The PSU and PCON module 829 communicates, as depicted by an arrow 818, with an LVR module 817. The connection 818 shows a unidirectional flow of information between the LVR input module 817 and the PSU and PCON module 829. The connection depicts that the power flows from the LVR input module 817 to the PSU and PCON module 829. The LVR Input module 817 consists of connectors and associated circuitry to channel the power to the PSU and PCON module 829. The connectors of the LVR input module 817 allow connection to the external device and provide power to the external device. In the case of FPC system 100 (see FIG. 1) the external device is the Smart Base 114.

The processor and support module 1101HM communicates, as depicted by an arrow 146, with environmental sensor modules 820. The connection 146 depicts a unidirectional flow of information between the Environment Sensors module 820 and the Processor and Support module 1101HM. The Environment sensors module 820 consists of the environment sensors present in the Hub 112 such as Temperature sensors, Pressure sensors, Sound sensors, Light sensors, Proximity sensors and so on. The module 820 also contains the associated circuitry to read information from these sensors and detect any error conditions, which it can then feed back to the Processor and Support module 1101HM through the connection 146.

The processor and support module 1101HM communicates, as depicted by an arrow 821, with an LCD/Display support module 822. The connection 821 depicts a unidirectional flow of information between the Processor and Support module 1101HM and the LCD Display/Support module 822. The information flows from the Processor and Support module 1101HM to the LCD Display/Support module 822 and thus the information is output to the LCD Display/Support module 822. The LCD Display/Support module 822 includes the components and the circuitry to drive the display on the Hub 112. The information to be displayed is determined by the Processor and Support module 1101HM from the information/communication with other modules in the Hub 112.

The processor and support module 1101HM communicates, as depicted by an arrow 823, with an encoder ring module 824. The connection 823 depicts a unidirectional flow of information between the Processor and Support module 1101HM and the Encoder Ring module 824. The Processor and Support module 1101HM receives input from the Encoder ring module 824, which is generated when the user uses the scroll wheel 140 of Hub 112 in FIG. 1. The Encoder ring module 824 includes all the circuitry to support and detect the movement of the scroll wheel 140 of Hub 112 in FIG. 1.

The processor and support module 1101HM communicates, as depicted by an arrow 825, with a motion sensing module 826. The connection 825 depicts a unidirectional information flow between the Processor and Support module 1101HM and the Motion Sensing module 826. The Processor and Support module 1101HM receives information input from Motion Sensing module 826. The Motion Sensing module 826 includes the circuitry to support and detect motion, through 143 of Hub 112 in FIG. 1.

The processor and support module 1101HM communicates, as depicted by an arrow 827, with a speaker support module 828. The connection 827 depicts a unidirectional information flow between the Processor and Support module 1101HM and the Speaker/Support module 828. The Processor and Support module 1101HM outputs the information to the Speaker/Support module 828. The Speaker/Support module 828 includes the circuitry to support and drive the Speaker in Hub 112. This speaker is used to provide audible feedback to the user when the hub user interfaces (tactile switch 1501 or GUI 140) are used by the user on the Hub 112. The user interfaces 1501 and 140 constitute part of the user interface available to the user to interact with the FPC system 100 through the Hub 112.

FIG. 9 is an example of a functional software block diagram which may be used to implement the Hub module 114. A main control module 923 communicates, as depicted by an arrow 902, with an LCD driver GUI 901. The connection 902 depicts a bidirectional flow of information between the LCD Driver GUI 901 and the Main Control module 923. The LCD Driver GUI module 901 includes the functionality to provide/display a Graphical User Interface (GUI), to the user on the display 142 of Hub 112 in FPC system 100 (see FIG. 1). This graphical User Interface (GUI) aids the user to select and control the FPC system 100. The Graphical User Interface (GUI) also displays the current status of the FPC system 100. The LCD Driver GUI module 901 also includes the drivers required to drive the LCD, in order for it to display the GUI. The Main Control module 923 takes input from the LCD Driver GUI module 901, when the user provides inputs and make changes to the configuration of the FPC system. The Main Control module 923 outputs information to the LCD Driver GUI module 901 when the Main Control module 923 provides the FPC system status information, to be displayed on the LCD.

The main control module 923 communicates, as depicted by an arrow 912, with a sound module 911. The connection 912 depicts a bidirectional flow of information between the Sound module 911 and the Main Control module 923. The sound module 911 contains the functionality to provide an output sound to the Speaker/Support module 828 as depicted in FIG. 8. The sound module 911 also contains functionality to read the sound information through the Environment Sensor module 820 in FIG. 8.

The main control module 923 communicates, as depicted by an arrow 913, with a scroll wheel encoding module 914. The connection 913 shows a bidirectional flow of information between the Scroll Wheel Encoding module 914 and the Main Control module 923. The Main Control module 923 can receive input from the Scroll Wheel Encoding module 914, when the user uses it on the Hub 112. The user will use it as part of the interface provided to the user, to select or make changes to the FPC system configuration. The user is also able to move between different screens of the display 142 on the Hub 112.

The main control module 923 communicates, as depicted by an arrow 915, with a battery and power management module 916. The connection between the Battery & Power Management module 916 and the Main Control module 923 shows a bidirectional flow of information between these modules. The Main Control module 923 receives information about the status of Battery and Power from the Battery and Power management module 916 and also can control the Battery and Power Management module 916. An example of information would be the Battery status as well as controlling the Power Management circuitry, to select the source of power.

The main control module 923 communicates, as depicted by an arrow 917, with a data storage and management module 918. The connection 917 shows a bidirectional flow of information between Main Control module 923 and the Data Storage and Management module 918. The Data Storage and Management module 918 performs storage of data in the FPC system and management. This includes the volatile and non-volatile storage as well as removable storage. The Main Control module 923 can output information to the Data storage and Management module 918 as well as read information from it if required. Reading would occur when the Main Control module 923 needs information from the storage, and writing would occur when the Main Control module 923 needs to store information to the memory.

The main control module 923 communicates, as depicted by an arrow 919, with a USB interface module 920. The connection 919 shows a bidirectional flow of information between the Main Control module 923 and the USB Interface module 920. The USB interface module 920 provides functionality related to the operation of USB module 815 in FIG. 8. According to one FPC arrangement, the Main Control module 923 can communicate with the USB interface module 920 and allows the exchange of information in both directions. i.e. the information can be written to or read from, the Hub 112.

The main control module 923 communicates, as depicted by an arrow 921, with a memory management module 922. The connection 921 shows a bidirectional flow of information between Memory Management module 922 and the Main Control module 923. The Memory Management module 922 manages the memory in the Hub 112. This includes both volatile and non-volatile as well as removable/non-removable memory. The Memory Management module 922 ensures that the memory is available when needed by the FPC system and it is working in an optimum way.

The main control module 923 communicates, as depicted by an arrow 909, with a sensor management module 910. The connection 909 shows a bidirectional flow of information between the Main Control module 923 and the Sensor Management module 909. The Sensor Management module 909 takes care of all sensors in the FPC system. This module reads information from the sensors and provides the information to the Main Control module 923. The Sensor Management module 909 also provides status information about the sensors. The Main Control module 923 can also output information to the Sensor Management module 909, to control some sensors like sound as well as Temperature/Humidity etc.

The main control module 923 communicates, as depicted by an arrow 908, with a cloud interface/web module 907. The connection 908 depicts a bidirectional flow of information between the Cloud Interface/Web module 907 and the Main Control module 923. The Cloud Interface/Web module 907 includes the necessary drivers as well as functionality to interface with the Cloud (e.g. the Internet 101) and Web devices. The Cloud Interface/Web module 907 can do so using, for example, module 809 through connection 810 in FIG. 8 and the Wi-Fi network connection 108 through router 103 in FIG. 1. The Main Control module 923 can output the information as well as receive information from the Cloud Interface/Web module 907.

The main control module 923 communicates, as depicted by an arrow 906, with a key detect and implement module 905. The connection 906 depicts a bidirectional flow of information between the Main Control module 923 and the Key Detect and Implement module 905. The Key Detect and Implement module 905 includes the functionality to detect the press of Switch 1501. Once detected this information is then passed onto the Main Control module 923 which can then process the information if needed. In one FPC arrangement, the Main Control module 923 can output information to the Key Detect and Implement module 905.

The main control module 923 communicates, as depicted by an arrow 904, with an error detection and management module 903. The connection 904 depicts a bidirectional flow of information between the Main Control module 923 and the Error Detection and Management module 903. The Error Detection and Management module 903, takes care of errors which may occur in the FPC system. The Error Detection and Management module 903 ensures that the errors are detected correctly and reliably, and that this information is provided to the Main Control module 923. The Main Control module 923 can also communicate information to the Error Detection and Management module 903, if required.

FIG. 3 is an example of a process 300 used by the FPC arrangement to control the air conditioner 104. In a step 303, the processor 1101SBM in the Hub 112, directed by the software program 1133SBM, determines if the Hub module 112 is docked to the Smart base module 114. This determination is based on the amplitude of the communication signal 116 between the Hub module 112 and the Smart base module 114. When the strength is above a pre-set value, the Hub knows that it is docked.

The Hub module 112 is determined to be docked to the Smart base module 114 if the amplitude of the communication signal 116 between the Hub module 112 and the Smart base module 114 exceeds a predetermined threshold Dt1.

If the Hub module 112 is docked to the Smart base module 114, then control follows a YES arrow 302 to a step 307. In the step 307, the processor 1101SBM in the Smart base 114, directed by the software program 1133SBM, passes control of the air conditioner operation to the Hub sensor 136 and the Hub interface 140, 1501. The process 300 then follows an arrow 301 back to the step 303. If however the step 303 determines that the Hub module 112 is not docked to the Smart base module 114, then control follows a NO arrow 304 to a step 305. In the step 305, the processor 1101SBM in the Smart base 114, directed by the software program 1133SBM determines if the Hub 112 is within wireless communication range of the Smart base 114. If this is the case, then control passes to the step 307.

The Hub module 112 is determined to be within wireless communication range of the Smart base module 114 if the amplitude of the communication signal 116 between the Hub module 112 and the Smart base module 114 exceeds a predetermined threshold Dt2.

Although as noted above, in the step 307 the processor 1105SBM in the Smart base 114, directed by the software program 1133SBM, passes control of the air conditioner operation to the Hub sensor 136 and the Hub interface 140, 1501, the FPC system enables the user to select among the various sensors that are available in the FPC system. Accordingly, the user can make a different sensor selection if the user is not happy with the default temperature sensor being used by the FPC system. Furthermore, since the disclosed FPC arrangement enables the user to move the Hub 112 from a docked position to an undocked position as he or she pleases (for example the user might wish to place the Hub 112, on his/her bedside table) the FPC system can use the temperature sensor or combination of temperature sensors selected by the user in order to provide more flexible control to the user. The same applies to other sensors such as humidity and so on.

Returning to the step 305, if the processor 1105SBM in the Smart base 114, directed by the software program 1133SBM determines that the Hub 112 is out of wireless communication range of the Smart base 114 (this determination can arise either if the Hub 112 is operative but out of range, or if the Hub 112 has failed), then control passes to a step 308, which passes control of the air conditioner operation to the Smart base sensor 135 and the Smart base interface 128, 129.

Figure 12:
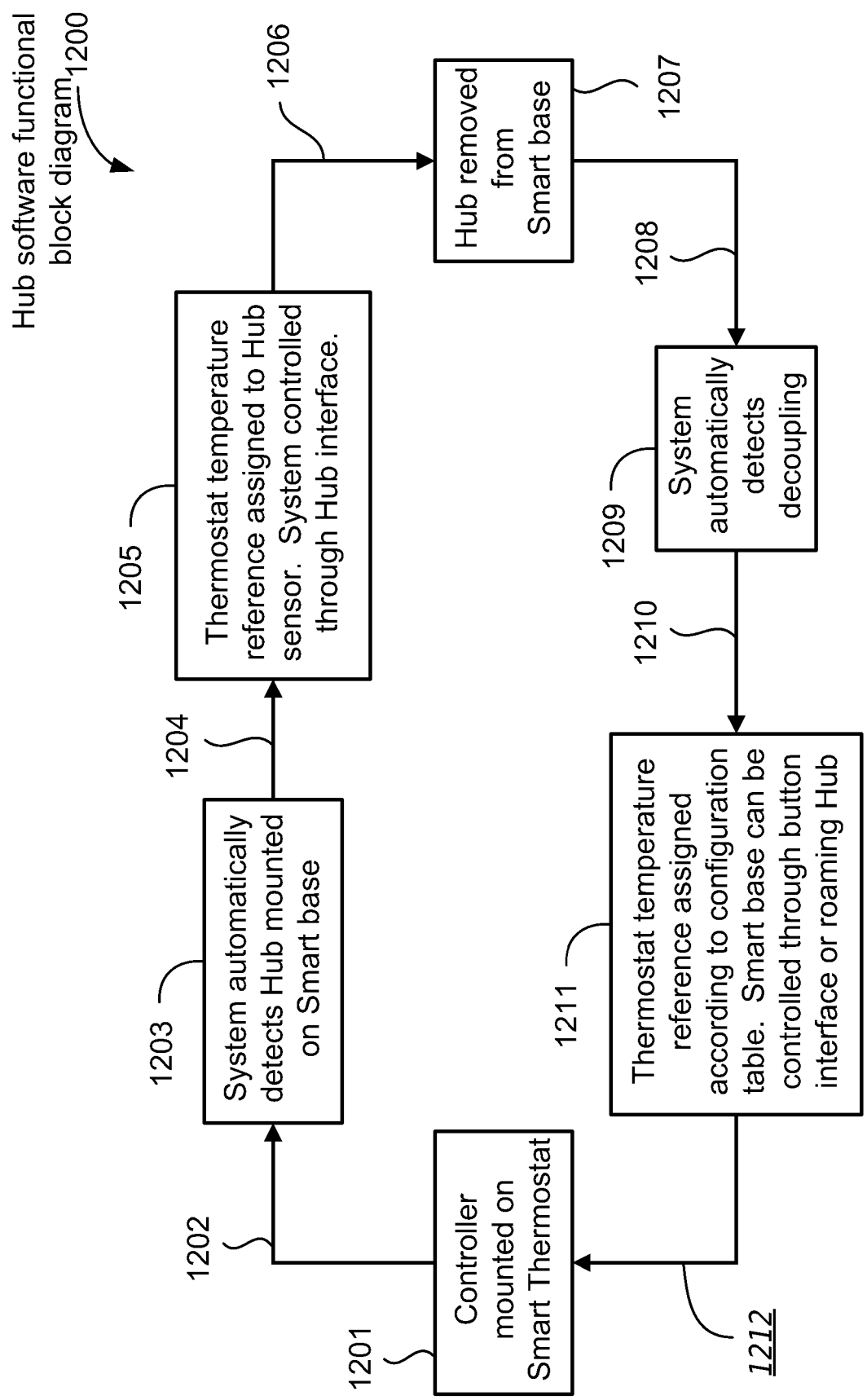
FIG. 12 is an example of a process which may be used by the FPC arrangement.

FIG. 12 is an example of a process which may be used by the FPC arrangement. In a step 1201 the user docks the Hub 112 to the Smart base 114. In a following step 1203, performed by the processor 1105SBM in the Smart base 114 directed by the software program 1133SBM, the Smart base 114 determines that the Hub 112 is in a docked state. In a following step 1205, performed by the processor 1105SBM in the Smart base 114 directed by the software program 1133SBM, the Smart base 114 passes control of the air conditioner operation to the Hub sensor 136 and the Hub interface 140.

In a following step 1207 the user removes the Hub 112 from the Smart base 114 in order to take the Hub 112 to another location which in the present example takes the Hub 112 out of wireless communication range of the Smart base 114. In a following step 1209, performed by the processor 1105SBM in the Smart base 114 directed by the Smart base software program 1133SBM, the Smart base 112 determines that the Hub 112 has been undocked, and since it also determines that the Hub 112 is out of wireless communication range, a following step 1211, performed by the processor 1105SBM in the Smart base 114 directed by the software program 1133SBM, passes control to the Smart base sensor 135 and the Smart base interface 128, 129. This scenario is also valid when the FPC system loses a Hub due to battery loss in the Hub or some mechanical damage to the Hub.

If the process is again directed to the step 1201 in which the Hub 112 is docked to the Smart base 114, then in the following step 1205, performed by the processor 1105SBM in the Smart base 114 directed by the software program 1133SBM, control of the air conditioner operation is passed to the Hub sensor 136 and the Hub interface 140.

When the Hub 112 is docked to the Smart base 114, the Hub sensor 136 is used to control the air conditioner. When the Hub 112 is undocked from the Smart base 114, as long as the Hub 112 is within wireless communication range and in wireless communication with the Smart base 114, the Hub sensor 136 is used to control the air conditioner.

When the Hub 112 is no longer in wireless communication with the Smart base 114 through the wireless network, the Smart base 114 runs in standalone operation, using its sensor 135 to control the air conditioner.

The device whose temperature sensor is used is said to be in control of the air conditioner, as the control point from that device is used.

The actual control logic to control the air conditioner is typically located in the Smart base 114. Depending on the selection of sensors by the FPC system, or by the user, the control temperature value is given to the Smart base 114 for controlling the air conditioner 104. The Smart base 114 compares the control temperature value with the Set Temperature required by the user, to generate an error signal, to control the air conditioner 104. The Smart base 114, with its stored information (see FIG. 2), controls the FPC system, until the user demand is satisfied.

If the Smart base sensor 135 is being used for control, the Smart base 114 can use its own temperature value as the control temperature value. If the Hub sensor 136 is being used for control, the Hub 112 will provide its temperature sensor value to the Smart base 114, to use it as a control temperature. If the user has selected to average the sensors, the Hub 112 will provide information on the Hub GUI (140, 142) to the user, to obtain the user input, then, according to the user selection, will provide the control temperature value to the Smart base 114, as control temperature, which is the average of Hub and Smart base sensor.

In summary, typically when the Hub 112 is docked to, or within wireless communication range of, the Smart base 114, the Hub sensor 136 is used to control the air conditioner. When the Hub 112 is undocked from the Smart base 114, as long as the Hub 112 is within wireless communication range and in communication with the Smart base 114, the Hub sensor 136 is used to control the air conditioner.

When the Hub 1121 is no longer in wireless communication with the Smart base 114, the Smart base 114 runs in standalone operation, using its sensor to control the air conditioner.

Figure 4:
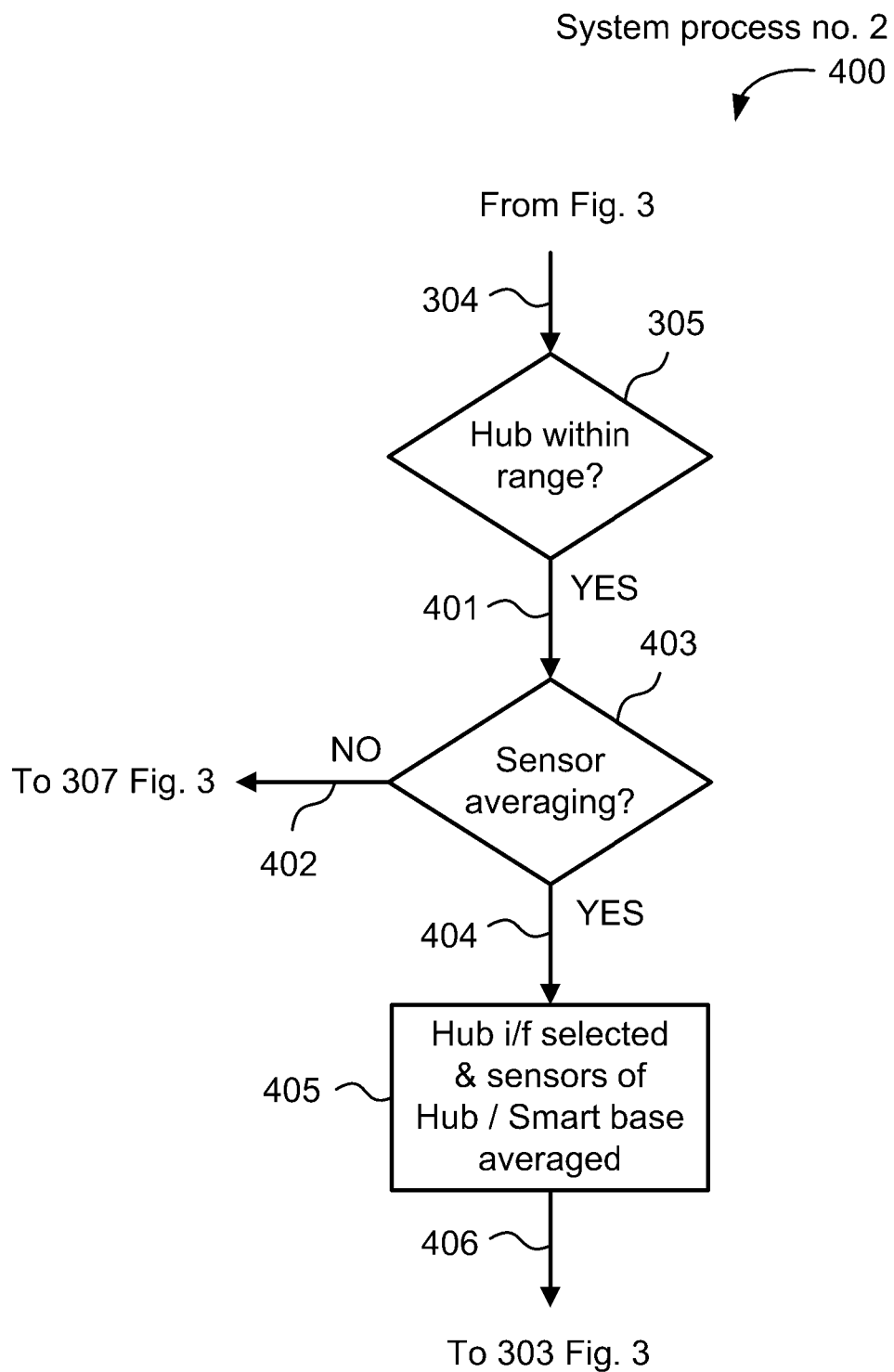
FIG. 4 is an example of another process which may be used by the FPC arrangement to control the air conditioner.

FIG. 4 is an example of another process 400 which may be used by the FPC arrangement to control the air conditioner 104. The process 400 may be used if it is desired to average the outputs 145, 146 of the Smart base sensor 135 and the Hub module sensor 136 when the Hub module 112 is undocked from but within communication range of the Smart base module 114, and the Smart base 114 is not in override mode.

In the step 305 (see FIG. 3), the processor 1105SBM in the Smart base 114, directed by the software program 1133SBM, determines if the Hub module 112 is within communication range. If this is the case then control follows a YES arrow 401 to a determination step 403. In the step 403, performed by the processor 1101HM executing the FPC software application 1133HM, determines if sensor averaging is desired by the user based, for example, upon the user input 141 to the user interface 140/1501 of the Hub module 112.

The Hub 112 presents the user with a suitable GUI display which the user uses for sensor selection. This is used if the user wants to select a sensor, different from the current selection, whether it was previously selected by the FPC system or by the user.

When the Hub is within range and connected to the Smart base, both the Hub and the Smart base sensors are available for selection. When more than 1 temperature sensor is available, the Hub 112 provides the following options on the Hub GUI to the user:

Select an individual sensor;
Average of 2 or more sensors; OR
Average all.

The processor 1101HM executing the FPC software application 1133HM, performs a periodic check of sensor availability comprising the steps of (a) checking which sensors are available, and (b) flagging which sensors are available in a sensor availability table in the Hub memory 803.

If sensor averaging is not desired by the user, then control follows a NO arrow 402 to the step 307 in FIG. 3. If, however, the step 403 determines that sensor averaging is desired, then control follows a YES arrow 404 to a step 405. In the step 405 the processor 1101HM in the Hub, directed by the FPC software program 1133HM, passes control to the user interface 140, 1501 of the Hub module and averages the signals of the sensors 135, 136.

If more than 1 sensors are available for averaging, the Hub 112 will present the average of sensor values as a control temperature value, to the Smart base 114. The Smart base 114 can then use this value to control the air conditioner.

Figure 5:
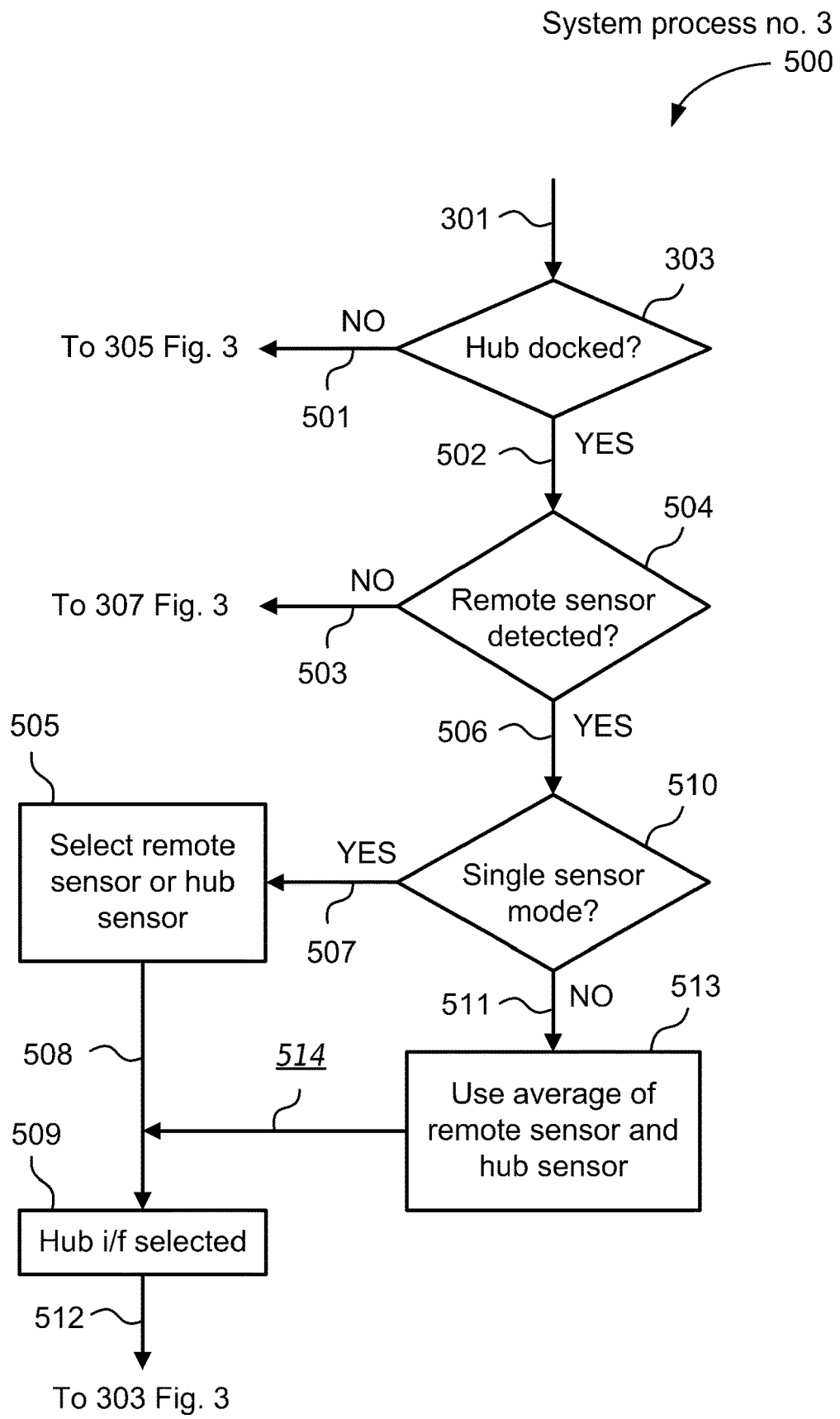
FIG. 5 is an example of another process which may be used by the FPC arrangement to control the air conditioner.

FIG. 5 is an example of another process 500 which may be used by the FPC arrangement to control the air conditioner 104 when the Hub module 112 is docked with the Smart base module 114. The process 500 may be used if it is desired to (i) select between the Hub module sensor 136 and the remote sensor 120, and (ii) to select single sensor or sensor averaging operation.

In the step 303 (see FIG. 3), the processor 1105HM in the Hub 112 directed by the software program 1133HM, determines if the Hub module 112 is docked with the Smart base module 114. If this is not the case, then control follows a NO arrow 501 to the step 305 in FIG. 3. If however the step 303 determines that the Hub module 112 is docked with the Smart base module 114, then control follows a YES arrow 502 to a step 504. In the step 504, the processor 1105HM executing the FPC software application 1133HM in the Hub 112, determines if the remote sensor 120 is within communication range of the Hub module 112 (i.e. the Hub 112 attempts to discover the remote sensor 120). The remote sensor 120 is determined to be within communication range of the Hub module 112 if the amplitude of the communication signal 119 between the remote sensor 120 and the Hub module 112 exceeds a predetermined threshold RSt1.

If the remote sensor 120 is not within communication range of the Hub module 112 then control follows a NO arrow 503 to the step 307 in FIG. 3. If however the step 504 determines that the remote sensor 120 is in communication range, then control follows a YES arrow 506 to a step 510. In the step 510, the processor 1101HM in the Hub module 112, directed by the software program 1133HM, determines, based upon a control signal 141 received by the user interface 140 of the Hub module 112 from the user, if the user wishes to use a single sensor mode or an averaged sensor mode. If the user specifies a single sensor mode, then control follows a YES arrow 507 to a step 505. In the step 505, the processor 1101HM in the Hub module 112, directed by the software program 1133HM, determines, based upon a control signal 141 received by the user interface 140 of the Hub module 112 from the user, if the user wishes to use the Hub sensor 136 or the remote sensor 120.

In a single Hub, single Smart base FPC system, both the Hub 112 and the Smart base 128 have built-in temperature sensors 136, 135 respectively. These sensors can be selected by the user to control the air conditioner 104 in different ways, as shown in the following Table 2:

TABLE 2

| Sensors available | User Selection | Sensor in control |
| --- | --- | --- |
| Hub sensor/Smart base sensor | Hub Sensor | Hub Sensor |
| Hub sensor/Smart base sensor | Smart base sensor | Smart base Sensor |

When the user selects a sensor using the Hub GUI 142, 140, the Hub 112 stores the selection in its internal memory 803. The Hub 112 provides the control temperature value to the Smart base 114. The Hub 112 regularly checks the stored information specifying the sensor selection to determine which sensor is to be used to control the air conditioner. The Hub 112 then uses the value of that sensor and provides it as a control temperature value to the Smart base 114.

The Hub 112 also regularly checks if the sensor selected by the user is available. If for some reason, the FPC system loses the sensor being used to control the air conditioner 104, the FPC system cannot control the air conditioner, as it has no reference to the current temperature. The user then needs to go to the Hub GUI 142, 140 to select another available sensor to make sure the FPC system has a temperature reference to control the air conditioner.

The ability to use any one of the sensors provides the user with the option to better control the environment. In situations where one of the sensors that was selected to control the air conditioner becomes unavailable, the user has the option to use other sensor to control.

A number of considerations can lead a user to use a hub sensor such as 136. For example, a Hub in the FPC system provides the user with the ability to control the air conditioner 104 without restricting the user's mobility. The user can dock the Hub 112 on the Smart base 114 or the Hub 112 can be taken anywhere in the property, as long as the Hub 112 remains in wireless communication with the Smart base 114. With this mobility available, the user may wish to use the temperature of the Hub location. For example, the Hub 112 may be located at the bed side in the user's bedroom, whereas the FPC system might be using the Smart base sensor 135, which may be installed near the air conditioner 104. If the Smart base is in the basement, directly in sunlight, or near a door, for example, the temperature value it provides for control of the air conditioner 104 may be unsuitable for controlling the environment in the user's bedroom. The user has however the flexibility to use the temperature of the area in which the user is located by using the Hub sensor 136.

A number of considerations can lead a user to use a Smart base sensor such as 135. For example, the Smart base 114 might be installed in a desirable location in comparison to the Hub 112. For example the Smart base 114 might be in a baby's room. It is noted that in override or standalone operation, the Smart base 114 will use its own sensor 135, even though the Hub sensor 136 might have been used previously.

Auto selection: In a FPC system, since there are typically numerous temperature sensors available at any time, the FPC system advantageously can make a decision on which sensors to use to control the FPC system, particularly when there has been no sensor selection by the user and the FPC system needs a temperature sensor to be selected to control the air conditioner 104.

In auto-selection mode, the sensor selection used by the FPC system (this can be performed by the Hub 112 or the Smart base 114) is described by information in the following auto-sensor selection Table 3:

TABLE 3

| Hub status | Smart Base status | Selection | Sensor Control |
| --- | --- | --- | --- |
| Docked/Undocked in range | Normal Operation | Hub Sensor | Hub Sensor |
| Docked/Undocked in range | Override Mode | Hub Sensor | Smart base sensor |
| Docked/Undocked out of range | Standalone Operation | Hub Sensor | Smart base sensor |
| Docked/Undocked in range | Override Mode | Hub Sensor | Smart base sensor |

Auto selection of sensors ensures that the FPC system operates in a satisfactory manner even when the user has not selected specific sensors for control.

Average Sensors: Since a number of temperature sensors are typically available in the disclosed FPC system, the user can use the average of two or more sensors to get a more accurate control.

If the user, using the Hub GUI 142, 140, chooses to use an average sensor approach, the Hub 112 will use, for example, the average of temperature values of the Hub and the Smart base sensors 136, 135 or the average of Hub and Remote Sensor value, as per selection respectively. The average sensor value will then be provided as the control temperature value to the Smart base 114, to control the air conditioner. The Smart base 114 compares the average control temperature value from the sensors with the user required Set Temperature, and depending on the difference, the Smart base 114 turns the Compressor of the air conditioner 104 ON/OFF, to satisfy the user requirement.

A number of considerations can lead a user to use a the Average sensors capability. For example, average sensor use enables a user to reduce the temperature variation which might otherwise be present across a large area. Thus, for example, the user might have the Smart base 114 installed in one part of the living area and the Hub 112 may be located in another part of the living area. By averaging the Smart base sensor 135 and the Hub sensor 136, a more comfortable temperature can often be achieved over the entire area.

Returning to FIG. 5, control then follows an arrow 508 to a step 509. In the step 509, the processor 1101HM in the Hub module 112, directed by the software program 1133HM, allocates control to the Hub interface 140/1501.

Returning to the step 510, if the user does not specify a single sensor mode, then control follows a NO arrow 511 to a step 513. In the step 513, the processor 1105 in the Hub module 112, directed by the software program 1133, determines the average of the outputs 146, 119 of the Hub module sensor 136 and the remote sensor 120 as described above. Control then follows an arrow 514 to the step 509.

INDUSTRIAL APPLICABILITY

The arrangements described are applicable to the HVAC industries and particularly for the HVAC control industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:
1. A heating, ventilation and air conditioning (HVAC) control system comprising:
 a smart base which is fixedly attached to a building whose HVAC unit is to be controlled, the smart base being directly connected to the HVAC unit to be controlled; and
 a hub which is removably dockable to the smart base; wherein:
 the smart base comprises:
 a smart base user interface for controlling a limited set of HVAC parameters; and
 a wireless communication module for communicating with the hub over a low power wireless network;
 the hub comprises:
 a hub user interface for controlling a comprehensive set of HVAC parameters; and
 a wireless communication module for communicating with the smart base over the low power wireless network; and wherein
 the hub and the smart base are configured to enable the hub user interface to control the comprehensive set of HVAC parameters if at least one of:
 the hub is docked to the smart base; and
 the hub is undocked from the smart base and the hub is within communication range of the smart base over the low power wireless network; and wherein if the hub is unable to communicate with the smart base over the low power wireless network the smart base controls the HVAC system dependent upon the smart base user interface and last active control settings stored in the smart base prior to losing communication connection with the hub.

2. The HVAC control system of claim 1, wherein:
the smart base further comprises a smart base sensor for sensing a value of an environmental parameter;
the hub further comprises a hub sensor for sensing the value of the environmental parameter; and
the smart base and the hub are configured, when the hub is either docked to the smart base or is within communication range of the smart base over the low power wireless network, to control the comprehensive set of HVAC parameters dependent upon (a) the hub user interface and at least one of (b) the smart base sensor, (c) the hub sensor, and (d) a combination of the smart base sensor and the hub sensor.

3. The HVAC system of claim 2, further comprising a free-standing sensor configured to communicate over the low power wireless network, wherein the smart base and the hub are configured, when the hub is either docked to the smart base or is within communication range of the smart base over the low power wireless network, to control the comprehensive set of HVAC parameters dependent upon (a) the hub user interface, and (b) at least one of the smart base sensor, the hub sensor, the free-standing sensor and a combination of two or more of the smart base sensor, the hub sensor and the free-standing sensor.

4. The HVAC system of claim 3, wherein:
the smart base is configured (a) to detect a loss of communication with the Hub and (b) control the limited set of HVAC parameters dependent upon the smart base sensor; and
the hub is configured to (a) to detect a failure of one of the hub sensor and the free-standing sensor, and (b) present associated sensor failure information on the hub user interface.

5. The HVAC system of claim 3, wherein upon detection of unavailability of one or more of the smart base sensor, the hub sensor and the free-standing sensor, the hub is configured to perform manual selection of one or more other sensors dependent upon user information input to the hub user interface, wherein said one or more manually selected sensors are used to control the HVAC system.

6. The HVAC system of claim 3, wherein upon detection of unavailability of one or more of the smart base sensor, the hub sensor and the free-standing sensor, the hub is configured to perform auto-selection of one or more other sensors dependent upon information in an auto-sensor selection table, wherein said one or more auto-selected sensors are used to control the HVAC system.

7. The HVAC system of claim 6, wherein:
the hub collects information about a state of the smart base and sends the collected information to at least one of a remote server and a mobile terminal for data storage;
the remote server has a remote server user interface, and the mobile terminal has a mobile terminal user interface; and
the remote server user interface and the mobile terminal user interface are configured to display the state of the smart base and control the comprehensive set of HVAC parameters over the Internet.

8. The HVAC system of claim 3, further comprising:
a wireless communication module for connecting at least one of the hub, the smart base and the free-standing sensor to at least one of a remote server and a mobile terminal over the Internet.

9. A smart base for use in a heating, ventilation and air conditioning (HVAC) control system, the smart base being fixedly attached to a building whose HVAC unit is to be controlled, the smart base being directly connected to the HVAC unit to be controlled, the smart base comprising:
a smart base user interface for controlling a limited set of HVAC parameters; and
a wireless communication module for communicating over a low power wireless network with a removably dockable hub; wherein
the smart base is configured to enable a hub user interface of the hub to control a comprehensive set of HVAC parameters if at least one of:
the hub is docked to the smart base; and
the hub is undocked from the smart base and the hub is within communication range of the smart base over the low power wireless network; and wherein if the hub is unable to communicate with the smart base over the low power wireless network the smart base controls the HVAC system dependent upon the smart base user interface and last active control settings stored in the smart base prior to losing communication connection with the hub.

10. A hub for use in a heating, ventilation and air conditioning (HVAC) control system, the hub being removably dockable to a smart base fixedly attached to a building whose HVAC unit is to be controlled, the smart base being directly connected to the HVAC unit to be controlled; the hub comprising:
a hub user interface for controlling a comprehensive set of HVAC parameters; and
a wireless communication module for communicating over a low power wireless network with the smart base; wherein:
the hub is configured to enable a hub user interface of the hub to control the comprehensive set of HVAC parameters if at least one of:
the hub is docked to the smart base; and
the hub is undocked from the smart base and the hub is within communication range of the smart base over the low power wireless network; and
wherein if the hub is unable to communicate with the smart base over the low power wireless network the smart base controls the HVAC system dependent upon the smart base user interface and last active control settings stored in the smart base prior to losing communication connection with the hub.

* * * * *